US007047585B2

(12) United States Patent
Boyer et al.

(10) Patent No.: US 7,047,585 B2
(45) Date of Patent: May 23, 2006

(54) POWER TOOL

(75) Inventors: Christopher T. Boyer, Oak Park, IL (US); John T. Gerritsen, Carpentersville, IL (US); Mark R. Lytell, Glendale Heights, IL (US); Joel G. Delman, Chicago, IL (US); Peter J. Kopec, Park Ridge, IL (US)

(73) Assignee: WMH Tool Group, Inc., Palatine, IL (US)

( * ) Notice: Subject to any disclaimer, the term of this patent is extended or adjusted under 35 U.S.C. 154(b) by 106 days.

(21) Appl. No.: 10/337,514

(22) Filed: Jan. 6, 2003

(65) Prior Publication Data

US 2003/0182749 A1 Oct. 2, 2003

Related U.S. Application Data

(63) Continuation-in-part of application No. 29/158,303, filed on Apr. 2, 2002, now Pat. No. Des. 474,087.

(51) Int. Cl.
*A47L 11/10* (2006.01)
*B60S 3/06* (2006.01)

(52) U.S. Cl. ............................ 15/97.1; 15/28; 15/230; 451/357; 451/359

(58) Field of Classification Search .................... 15/28, 15/97.1, 143.1, 230; 451/357, 359
See application file for complete search history.

(56) References Cited

U.S. PATENT DOCUMENTS 1,394,564 A 10/1921 Lindgren
2,597,971 A 5/1952 Burnham
D205,758 S 9/1966 Storm, Jr.
3,531,812 A * 10/1970 Goguen et al. .............. 15/97.1
3,733,634 A 5/1973 Golbe
3,952,239 A 4/1976 Owings et al.

(Continued)

FOREIGN PATENT DOCUMENTS

DE 200 09 624 A1 8/2000

(Continued)

OTHER PUBLICATIONS

European Search Report related to European patent application EP 03 00 6176, 8 pages (May 24, 2004).

(Continued)

*Primary Examiner*—John Kim
*Assistant Examiner*—Shay L. Balsis
(74) *Attorney, Agent, or Firm*—Fitch, Even, Tabin & Flannery

(57) ABSTRACT

A power tool in accordance with the invention includes a housing having a handle connected to the housing in at least one position and extending about the rear of the housing with first and second end portions positioned at least in part off the sides of the housing such that the handle allows an operator a range of locations about the housing to facilitate an effective two-handed grip to maintain control over the power tool. The power tool may include an actuator, such as a switch, to regulate power supplied to the tool's motor, and may automatically shift to deactivate the power tool when an unintentional impact above a predetermined magnitude is received by the power tool. The power tool may also include a recess for maintaining an accessory tool and may be designed so that it is both statically and dynamically balanced in order to provide a balanced tool both at rest and during operation, and in order to reduce the amount of vibration experienced by an operator during use of the tool.

35 Claims, 26 Drawing Sheets

U.S. PATENT DOCUMENTS

| | | | | |
|---|---|---|---|---|
| 4,102,084 | A | | 7/1978 | Bloomquist |
| D254,231 | S | | 2/1980 | Burglin et al. |
| 4,188,682 | A | | 2/1980 | Burglin et al. |
| 4,330,967 | A | | 5/1982 | Richardson |
| D264,797 | S | | 6/1982 | Burglin et al. |
| D273,079 | S | | 3/1984 | Ibaraki |
| D283,590 | S | | 4/1986 | Ibaraki |
| D295,253 | S | | 4/1988 | Ashworth |
| 4,747,733 | A | | 5/1988 | Akazawa |
| 4,791,694 | A | | 12/1988 | Itaya et al. |
| 4,879,847 | A | | 11/1989 | Butzen et al. |
| 4,899,414 | A | | 2/1990 | Irwin |
| 4,954,026 | A | | 9/1990 | Zurwelle |
| 4,965,905 | A | * | 10/1990 | Kitahata et al. ............. 15/97.1 |
| D312,714 | S | | 12/1990 | Simonelli et al. |
| D313,094 | S | | 12/1990 | Itaya et al. |
| 4,976,173 | A | | 12/1990 | Yang |
| D317,667 | S | | 6/1991 | Bolser et al. |
| 5,027,910 | A | | 7/1991 | Honsa et al. |
| 5,038,523 | A | | 8/1991 | Farber et al. |
| 5,074,081 | A | | 12/1991 | Beth et al. |
| 5,086,105 | A | | 2/1992 | Abe et al. |
| D332,734 | S | | 1/1993 | Fushiya et al. |
| D338,754 | S | | 8/1993 | Skrzypek et al. |
| 5,298,821 | A | | 3/1994 | Michel |
| D349,789 | S | | 8/1994 | Bunyea |
| 5,349,785 | A | | 9/1994 | Nickels, Jr. et al. |
| 5,368,424 | A | | 11/1994 | Bettenhausen |
| 5,375,289 | A | | 12/1994 | Miyaoka |
| 5,419,737 | A | | 5/1995 | Brazell et al. |
| 5,564,969 | A | | 10/1996 | Tsang |
| 5,593,312 | A | | 1/1997 | McCracken |
| 5,595,531 | A | | 1/1997 | Niemela et al. |
| 5,595,532 | A | | 1/1997 | McCracken |
| D378,002 | S | | 2/1997 | Hung |
| 5,642,008 | A | | 6/1997 | McCracken |
| 5,678,272 | A | | 10/1997 | McCracken et al. |
| D391,698 | S | | 3/1998 | McCracken et al. |
| D392,778 | S | | 3/1998 | McCracken |
| 5,794,300 | A | | 8/1998 | McCracken et al. |
| 5,813,805 | A | | 9/1998 | Kopras |
| 5,830,047 | A | | 11/1998 | McCracken |
| 5,902,080 | A | | 5/1999 | Kopras |
| 5,954,458 | A | | 9/1999 | Lee |
| D414,666 | S | | 10/1999 | Cortes |
| D418,264 | S | | 12/1999 | Rees |
| D418,642 | S | | 1/2000 | Rees |
| 6,168,507 | B1 | | 1/2001 | McCracken |
| D443,397 | S | | 6/2001 | Williams |
| 6,286,611 | B1 | | 9/2001 | Bone |
| 6,290,587 | B1 | | 9/2001 | McCracken et al. |
| 6,308,378 | B1 | | 10/2001 | Mooty et al. |
| D465,074 | S | | 10/2002 | McCracken et al. |
| 6,495,932 | B1 | | 12/2002 | Yoshimizu et al. |
| D474,087 | S | | 5/2003 | Boyer et al. |
| 6,558,090 | B1 | | 5/2003 | Lagaly et al. |
| D475,908 | S | | 6/2003 | Boyer |
| 6,573,621 | B1 | | 6/2003 | Neumann |
| 6,601,272 | B1 | | 8/2003 | Stvartak et al. |
| 6,629,331 | B1 | * | 10/2003 | Panfili et al. ............ 15/236.06 |
| 6,656,626 | B1 | | 12/2003 | Mooty et al. |
| 6,725,491 | B1 | * | 4/2004 | Hung ......................... 15/97.1 |
| 6,754,935 | B1 | | 6/2004 | Pozgay et al. |
| 2001/0004580 | A1 | | 6/2001 | Legner et al. |
| 2003/0199239 | A1 | | 10/2003 | Hung |
| 2003/0228833 | A1 | | 12/2003 | Boyer |
| 2004/0058632 | A1 | | 3/2004 | Boyer |

FOREIGN PATENT DOCUMENTS

| | | | |
|---|---|---|---|
| DE | 199 57 369 | A1 | 6/2001 |
| DE | 101 24 537 | A1 | 2/2002 |
| EP | 0 899 064 | A2 | 3/1999 |
| EP | 0 899 064 | A3 | 6/2000 |
| EP | 1 074 351 | A1 | 2/2001 |
| EP | 1 302 284 | A1 | 4/2003 |
| EP | 1 400 318 | A3 | 7/2004 |
| JP | 02 269555 | | 11/1990 |

OTHER PUBLICATIONS

Wen Products product information retrieved Dec. 18, 2002 from the Internet at http://www.wenproducts.com, 5 pages.

Interdynamics, Inc. product information retrieved Dec. 18, 2002 from the Internet at http://www.id-usa.com, 5 pages.

Partial European Search Report related to European Patent Application EP 03 00 6176, Feb. 9, 2004, 7 pages.

* cited by examiner

1/26

POWER TOOL

CROSS-REFERENCE TO RELATED APPLICATIONS

This application is a continuation-in-part of application Ser. No. 29/158,303, filed Apr. 2, 2002, now U.S. Pat. No. D,474,087 which is hereby incorporated herein by reference in its entirety.

BACKGROUND OF THE INVENTION

This invention relates generally to a power tool and, more particularly, to an electrically-powered polisher capable of orbitally moving a pad to polish a workpiece.

The tool industry offers a variety of power tools for performing work on various types of workpieces. One common shortcoming, however, is that the power tools do not offer a variety of effective positions with which an operator may grasp the power tool. For example, many power tools have designated handles with which the operator is to grasp the power tool, (e.g., one forward handle and one rearward handle, two side handles, etc.). By limiting the operator in this way, the power tool may become less comfortable to work with and more difficult to use for extended periods of operation.

In addition, current power tool configurations may force the operator to hold and actuate the power tool in a specific manner or with a specific hand, rather than provide the operator with the freedom to hold and actuate the tool as desired. For example, as mentioned above, some power tools may require the operator to hold a forward handle with one hand and a rearward handle with another and require the operator to actuate the power tool from the rear handle alone. This configuration may force the operator to turn the power tool on and off using a hand he or she does not feel comfortable using, or may force the operator to hold the tool in an uncomfortable manner so that the operator can actuate the power tool with the hand that feels most comfortable.

Current power tool handles also do not account for the varying hand sizes between operators. For example, power tool handles do not provide a variety of handle sizes from which the operator may choose in order to suit his or her hand size. Thus, while a single sized handle may be perfect for some operators, it may be too large or too small for other operators. In addition, current handles do not provide a structure that effectively enables the operator to "feel" where his or her hands are on the handle. Thus, the operator is required to break his or her concentration or focus on the workpiece in order to assure that his or her hands are properly positioned on the power tool. This distraction can be unacceptable to the operator, particularly when trying to position the tool on a specific portion of the workpiece.

Power tool designs also could add additional safety considerations. For example, some tools allow the operator to lock the actuator in the "on" position so that the operator does not have to continually apply force to the actuator in order to operate the tool. This feature is well accepted by the users. However, additional features could be added to accommodate the rare instance where the tool may be dropped during operation.

Furthermore, the use of accessories in conjunction with the operation of the power tool may also be necessary. For example, power tools tend to leave residual particles from the workpiece or from substances used on the workpiece that could be picked up at the time of operation. It would be advantageous if the accessories were readily available or proximate to the power tool itself. This would promote maintaining a clean and obstacle free work environment.

Another shortcoming associated with conventional power tools is that many do not attempt to balance the power tool both at rest and during operation. For example, many power tools are designed so that they are statically balanced (i.e., balanced at rest) but are not dynamically balanced. (i.e., balanced while in operation). This poses particular problems when the work element is to be applied to the workpiece in a uniform and even manner. If the tool is unbalanced while in operation, it can be very difficult, if not impossible, to apply the work element to the workpiece in the desired uniform or even manner. For example, when a random orbital polisher is unbalanced, it can be difficult to uniformly apply wax to and remove wax from the workpiece, which may even result in damage to the workpiece due to an excessive concentration of work on one portion.

Another shortcoming associated with dynamically unbalanced tools is that the operator often experiences an undesirable vibration of the tool while in operation. This tends to make it difficult to apply the work element uniformly over the workpiece and to make it uncomfortable to operate the power tool for both short and extended periods of operation.

SUMMARY OF THE INVENTION

A power tool in accordance with the invention includes a housing having a handle connected to the housing in at least one position and extending about the rear of the housing with first and second end portions positioned at least in part off the sides of the housing such that the handle allows an operator a range of locations about the housing to facilitate an effective two-handed grip to maintain control over the power tool. The first and second end portions of the handle may be enlarged with respect to the remainder of the handle and may include an outer elastomer surface to facilitate enhanced gripping for control over the power tool. In a preferred embodiment the outer elastomer surface is an elastomer injected overmolding located on the upper surfaces of the first and second end portions of the handle, and the enhanced gripping surfaces facilitate enhanced coordination of a two-handed grip on the handle to maintain control over the tool.

The power tool further includes a motor located at least partially within the housing and has a work element connected to and driven by the motor for working on a workpiece. Preferably the power tool will include an actuator, such as a switch, to regulate the power to the motor, with the switch being movable between an active position to allow power to the motor and a de-active position to generally prohibit power to the motor; thus, transitioning the power tool between an active state for working on a workpiece and a de-active state, respectively. Preferably, the switch is positioned such that it may be operated while a two-handed grip is maintained on the handle of the power tool. For example, the switch may be located in a predetermined spaced relation to the handle so that the switch is operable from either side of the power tool while a two-handed grip is maintained on the handle thereof.

A lever is preferably connected to the switch and movable to operate the switch between the active and de-active positions. The lever may include an operator which extends from the housing near at least one of the first and second end portions of the handle such that the switch can be transitioned between the active and de-active states while a two-handed grip is maintained on the first and second ends of the power tool. Preferably two operator portions will be provided, with one operator portion connected to the lever and extending from the housing near the first gripping position on the handle, and the second operator portion connected to the lever and extending from the housing near a second gripping position on the handle. The lever or operator portion may be elongated to provide a range of locations along the switch and along the handle from which the switch can be operated while maintaining the two-handed grip.

The actuator may further be configured to automatically shift to deactivate the power tool when an unintentional impact above a predetermined magnitude is experienced by the power tool. For example, the switch may be configured to automatically shift to deactivate the power tool when an unintentional impact above a predetermined magnitude is applied to one or more of the tool's front, rear, top, bottom and side wall portions, as well as the handle. In a preferred embodiment, the deactivation mechanism includes a spring (or springs) which bias the lever portion of the switch in the de-active or "off" state. When the actuator is placed in the active state, the spring is compress and is maintained in the compressed state by the frictional forces preventing the switch from returning to the "off" state. The power tool is automatically deactivated when an unintentional impact is applied that is of a magnitude sufficient enough to overcome the frictional force of the switch. Thus, when such a impact is experienced, the spring expands, thereby forcing the actuator into the off position, deactivating the power tool.

The power tool may also be designed so that it is both statically and dynamically balanced in order to provide a balanced tool both at rest and during operation, and in order to reduce the amount of vibration experienced by an operator during use of the tool. Each component of the power tool has a calculable mass, density and center of gravity, and can be statically and dynamically balanced in a manner characterized by the following equations. For example, the tool may be statically balanced as characterized by the equations:

$$m_{system}r_{system}=m_{CW}r_{CW}+m_{PH}r_{PH}+m_{PAD}r_{PAD}+m_{BO}r_{BO}=0$$

or $$m_{system}x_{system}=m_{CW}x_{CW}+m_{PH}x_{PH}+m_{PAD}x_{PAD}+m_{BO}x_{BO}=0$$

$$m_{system}y_{system}=m_{CW}y_{CW}+m_{PH}y_{PH}+m_{PAD}y_{PAD}+m_{BO}y_{BO}=0$$

wherein m denotes mass, subscript items CW, PH, PAD and BO denote the counterweight, pad holder, pad, and pad assembly bolt, respectively, r denotes a distance between the subscript item's center of gravity to the z-axis (which is defined by the motor output shaft), and x and y denote a distance between the subscript items center of gravity coordinate in the x and y plane, respectively, to the z-axis.

The tool may be dynamically balanced by making the angular momentum of the system parallel to the axis of rotation. This may be achieved by setting the net inertia forces $I_{yz}$ and $I_{xz}$ equal to zero in order to have no net moment on the system. Thus, the tool may be dynamically balanced as characterized by the following equations:

$$(Ix_Oz_O)_{system}=(Iy_Oz_O)_{system}=0$$

$$I_{X_OZ_O}=I_{X^{CW}Z^{CW}}+m_{CW}x_{CW}z_{CW}+I_{X^{PH}Z^{PH}}+m_{PH}x_{PH}z_{PH}=I_{X^{PAD}Z^{PAD}}+m_{PAD}x_{PAD}z_{PAD}+I_{x^{BO}z^{BO}}+m_{BO}x_{BO}Z_{BO}=0$$

$$I_{Y_OZ_O}=I_{Y^{CW}Z^{CW}}+m_{CW}y_{CW}z_{CW}+I_{Y^{PH}Z^{PH}}+m_{PH}y_{PH}z_{PH}+I_{Y^{PAD}Z^{PAD}}+m_{PAD}y_{PAD}z_{PAD}+I_{Y^{BO}Z^{BO}}+m_{BO}y_{BO}z_{BO}=0$$

wherein I denotes inertia and O is a moment center taken at a point of origin, and the dynamically balanced equation denotes that a net product of inertia of the pad assembly about point O, is equal to zero for dynamic balance.

If desired, these equations can be altered to take into account additional components of the power tool so that the tool may be more accurately modeled and balanced. For example, static balance may be characterized by the equations:

$$m_{system}r_{system}=m_{CW}r_{CW}+m_{PH}r_{PH}+m_{PAD}r_{PAD}+m_{BO}r_{BO}+m_{BE}r_{BE}+m_{SP}r_{SP}+m_{AD}r_{AD}=0$$

or $$m_{system}x_{system}=m_{CW}x_{CW}+m_{PH}x_{PH}+m_{PAD}x_{PAD}+m_{BO}x_{BO}+m_{BE}x_{BE}+m_{SP}x_{SP}+m_{AD}x_{AD}=0$$

$$m_{system}y_{system}=m_{CW}y_{CW}+m_{PH}y_{PH}+m_{PAD}y_{PAD}+m_{BO}y_{BO}+m_{BE}y_{BE}+m_{SP}y_{SP}+m_{AD}y_{AD}=0$$

and the dynamic balance may be characterized by the equations:

$$(Ix_Oz_O)_{system}=(Iy_Oz_O)_{system}=0$$

$$I_{X_OZ_O}=I_{X^{CW}Z^{CW}}+m_{CW}x_{CW}z_{CW}+I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}+I_{X^{BE}Z^{BE}}+m_{BE}x_{BE}z_{BE}+I_{X^{SP}Z^{SP}}+m_{SP}x_{SP}z_{SP}+I_{X^{AD}Z^{AD}}+m_{AD}x_{AD}z_{AD}=0$$

$$I_{Y_OZ_O}=I_{Y^{CW}Z^{CW}}+m_{CW}y_{CW}z_{CW}+I_{Y^{PH}Z^{PH}}+m_{PH}y_{PH}z_{PH}+I_{Y^{PAD}Z^{PAD}}+m_{PAD}y_{PAD}z_{PAD}+I_{Y^{BO}Z^{BO}}+m_{BO}y_{BO}z_{BO}+I_{Y^{BE}Z^{BE}}+m_{BE}y_{BE}z_{BE}+I_{Y^{SP}Z^{SP}}+m_{SP}y_{SP}z_{SP}+I_{Y^{AD}Z^{AD}}+m_{AD}y_{AD}z_{AD}=0$$

wherein subscript items BE, SP, and AD denote the pad assembly bearings, spacer and adhesive, respectively. The equations may also be modified to take into account accessories which are used with the tool such as bonnets. In alternate embodiments, however, the equations may be altered to take into account fewer components of the power tool. For example, a tool manufacturer such as a polisher manufacturer, may conclude that a desired or sufficient balance may be achieved by simply taking into account the counterweight, pad and pad holder. Thus, the above equations may be altered to eliminate reference to the bolt.

In a preferred embodiment, the counterweight of the tool is specifically designed to balance the tool both statically and dynamically. For example, the counterweight may be designed in a manner characterized by the following equations:

$$m_{CW}r_{CW}=-(m_{PH}r_{PH}+m_{PAD}r_{PAD}+m_{BO}r_{BO})$$

$$I_{X^{CW}Z^{CW}}=-(I_{X^{PH}Z^{PH}}+m_{PH}x_{PH}z_{PH}+I_{X^{PAD}Z^{PAD}}+m_{PAD}x_{PAD}z_{PAD}I_{X^{BO}Z^{BO}}+m_{BO}x_{BO}z_{BO}+m_{CW}x_{CW}z_{CW})$$

$$I_{Y^{CW}Z^{CW}}=-(I_{Y^{PH}Z^{PH}}+I_{Y^{PAD}Z^{PAD}}+I_{Y^{BO}Z^{BO}})$$

As mentioned above, the equations can be modified to more accurately model the tool if desired. For example, the pad assembly bearings, spacer and adhesive may be accounted for by rewriting the equations as follows:

$$m_{CW}r_{CW}=-(m_{PH}r_{PH}+m_{PAD}r_{PAD}+m_{BO}r_{BO}+m_{BE}r_{BE}+m_{SP}r_{SP}+m_{AD}r_{AD})$$

$$I_{X^{CW}Z^{CW}}=-(I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}+m_{CW}x_{CW}z_{CW}+I_{X^{BE}Z^{BE}}+m_{BE}x_{BE}z_{BE}+I_{X^{SP}Z^{SP}}+m_{SP}x_{SP}z_{SP}+I_{X^{AD}Z^{AD}}+m_{AD}x_{AD}z_{AD})$$

In a preferred embodiment, a counterweight designed to statically and dynamically balance the counterweight includes a first horizontal portion having first and second ends, and defining a first opening through which the motor shaft is disposed and a second opening through which the pad assembly shaft or bolt is disposed. The first horizontal portion is generally rectangular in shape and cross section and may include a first sleeve extending upward from the upper side of the horizontal portion about the circumference of the first opening such that the first sleeve and first opening coaxially define a threaded bore into which the motor shaft may be threaded, and a second sleeve extending downward from the lower side of the horizontal portion about the circumference of the second opening such that the second sleeve and second opening coaxially define a threaded bore into which the pad assembly shaft or bolt may be threaded.

The counterweight includes a generally rectangular connecting portion having first and second ends wherein the connecting portion is connected to the second end of the first horizontal portion via the first end of the connecting portion, and a second horizontal portion having first and second ends wherein the first end of the second horizontal portion is connected to the second end of the connecting portion such that the second horizontal portion is positioned generally parallel to the first horizontal portion. Collectively, the connecting portion and the second horizontal portion define an opening which separates the connecting portion and second horizontal portion into two leg members and allows for a desired mass to be reached so that the counterweight may be dynamically balanced.

First and second end members are connected to opposite ends of the counterweight. The first end member is connected to the second end of the second horizontal portion and has a generally arcuate shape, wherein the second end of the second horizontal portion is connected to the inner surface of the first end member. The second end member is connected to the first end of the first horizontal portion so that the second end member is generally positioned on the opposite side of the counterweight as the first end member.

The power tool may also include a recess for maintaining an accessory tool that is movable between the recess and a position remote from the recess to be used in connection with the power tool. In a preferred form, the housing defines a slot into which a brush type accessory tool may be inserted and stored, or from which the tool may be removed and used in connection with the power tool. The slot may include a groove that allows an operator to more easily remove the accessory tool, and, together with the accessory tool include a releasable locking mechanism which allows the accessory tool to be moved between a locked location on the power tool and an unlocked position remote from the power tool so that the accessory may be used in conjunction therewith.

Figure 1:
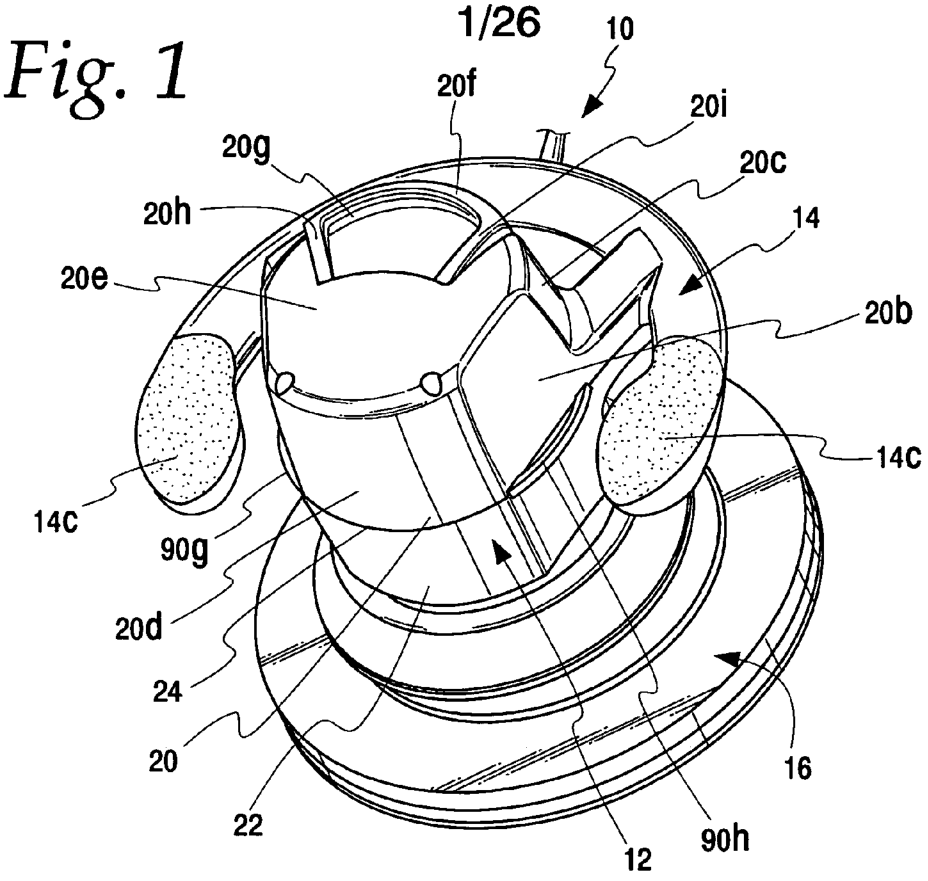
FIG. 1 is a perspective view of a power tool embodying features of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common, but well-understood elements that are useful or necessary in a commercially feasible embodiment, are typically not depicted in order to facilitate a less obstructed view of various embodiments.

DETAILED DESCRIPTION OF THE PREFERRED EMBODIMENTS

In FIGS. 1–19, there is illustrated a power tool 10 for working (e.g., waxing, buffing, polishing, etc.) on a workpiece in accordance with the present invention. The power tool 10 includes a housing 12, a handle 14 connected to the housing 12, and a work element, such as a pad 16, for working on a desired workpiece, such as the body of an automobile or hull of a boat. The power tool 10 includes a symmetrical design about a vertical reference plane (not shown) extending centrally from a forward end 18*a* to a rearward end 18*b* (see FIGS. 4 and 5). The cross-section illustrated in FIG. 10 is taken along the vertical reference plane.

The housing 12 includes an upper housing shell 20 and a lower housing shell 22 which, when connected to each other, interface along a parting line 24. The upper housing shell 20 and lower housing shell 22 can be made of any suitably lightweight material and are preferably molded plastic parts. The upper housing shell 20 and the lower housing shell 22 are secured together by a number of screws 23 recessed in the lower surface of the handle 14 (see FIGS. 6 and 7). Collectively the upper and lower housing shells 20 and 22 define an internal cavity 26 within which at least a portion of motor 28 is disposed (see FIG. 10).

Figure 6:
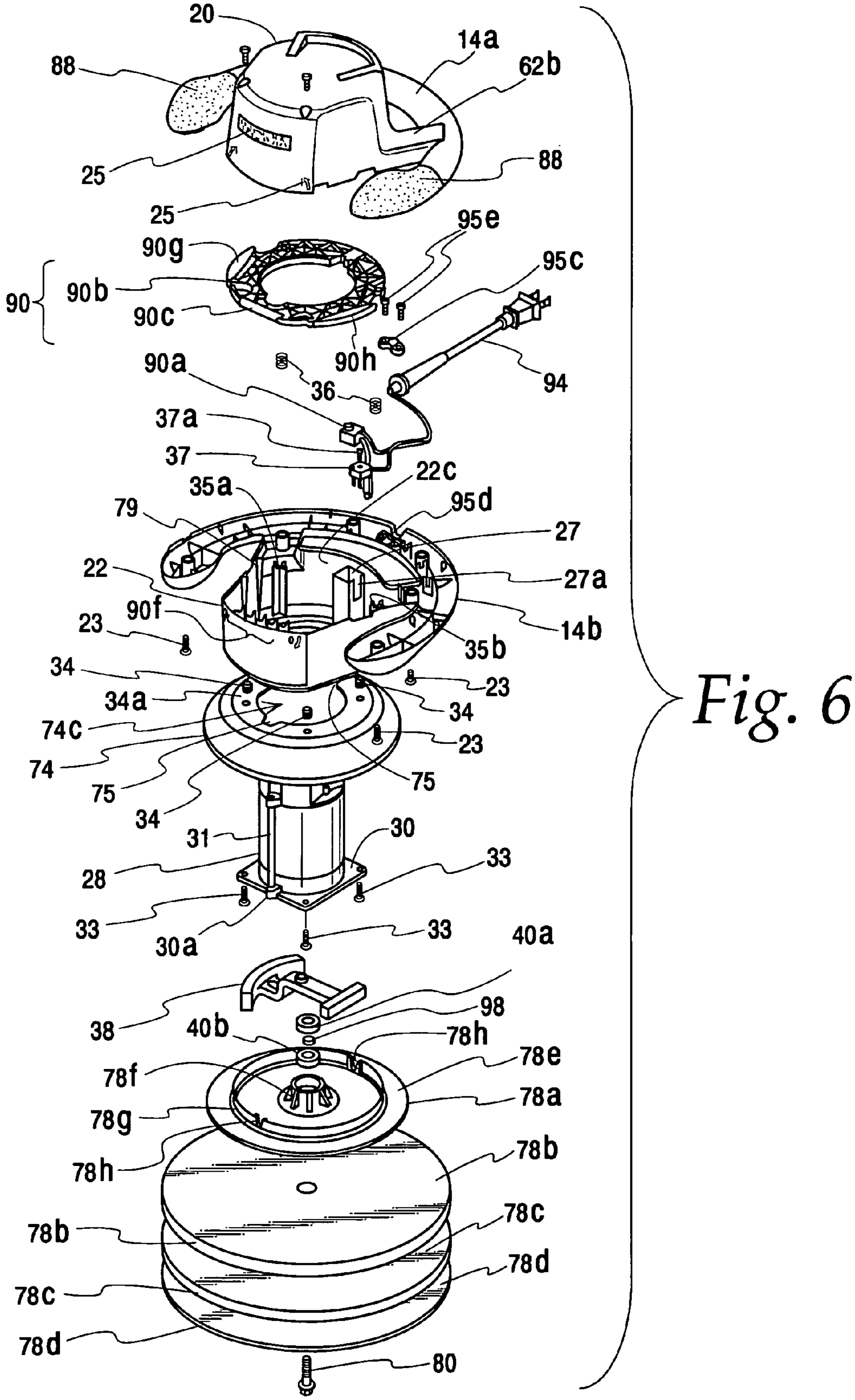
FIG. 6 is an exploded view of the power tool of FIG. 1.
Figure 9:
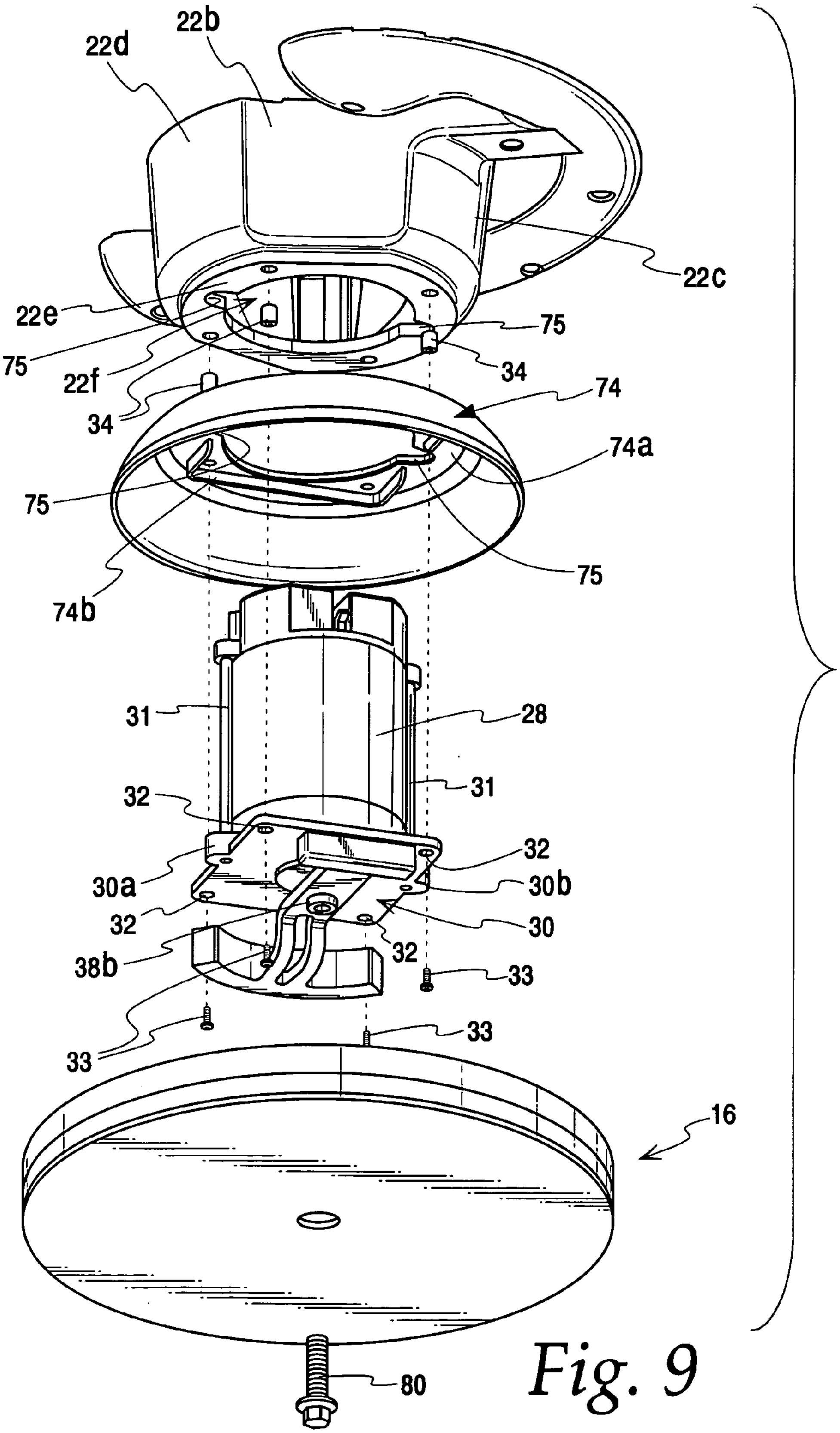
FIG. 9 is an exploded view of a portion of the power tool of FIG. 1 illustrating a lower tool assembly in accordance with the present invention.
Figure 10:
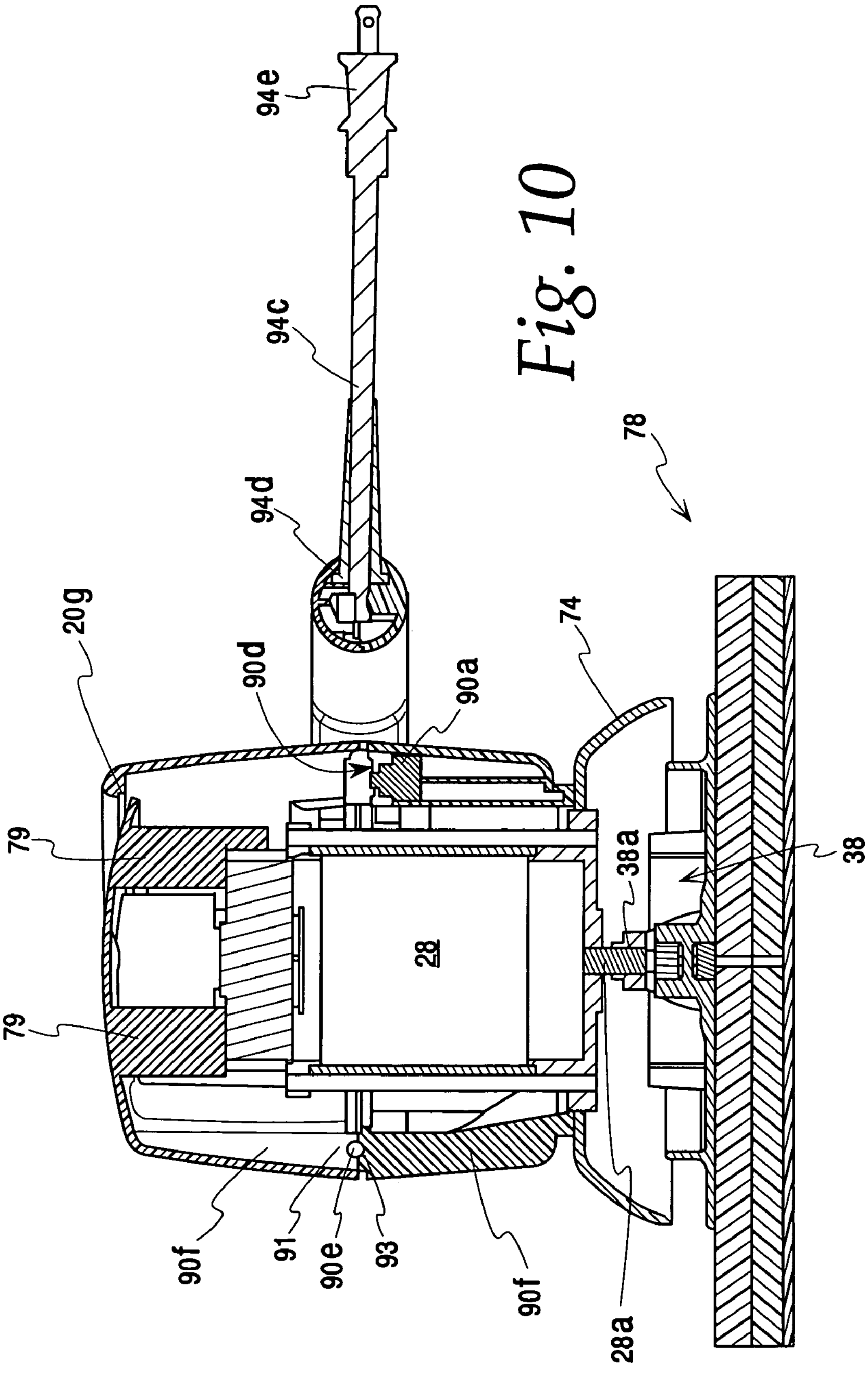
FIG. 10 is a cross-sectional view of the power tool of FIG. 1 taken along line 10—10 in FIG. 3.
Figure 11:
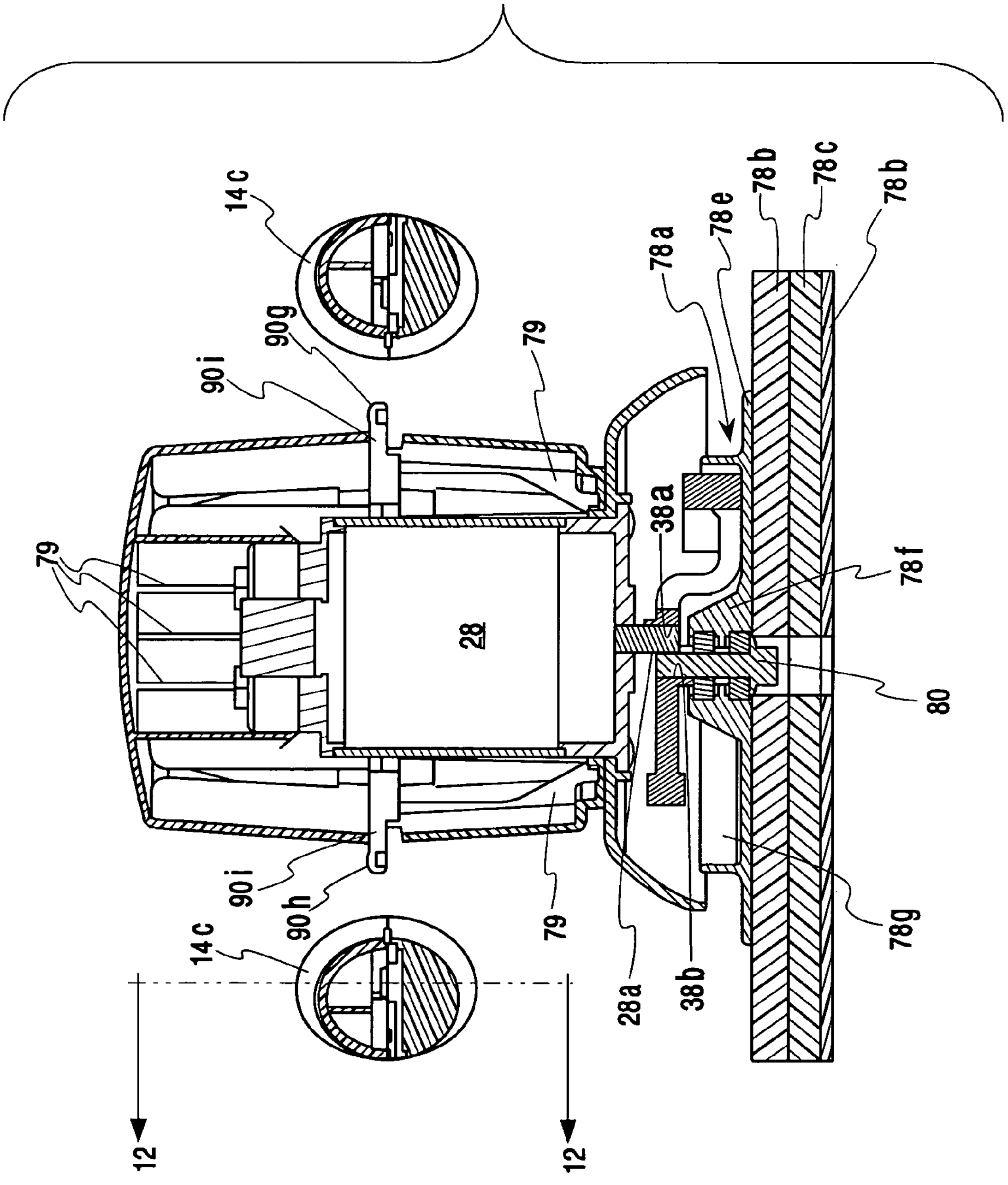
FIG. 11 is a cross-sectional view of the power tool of FIG. 1 taken along line 11—11 in FIG. 4.
Figure 12:
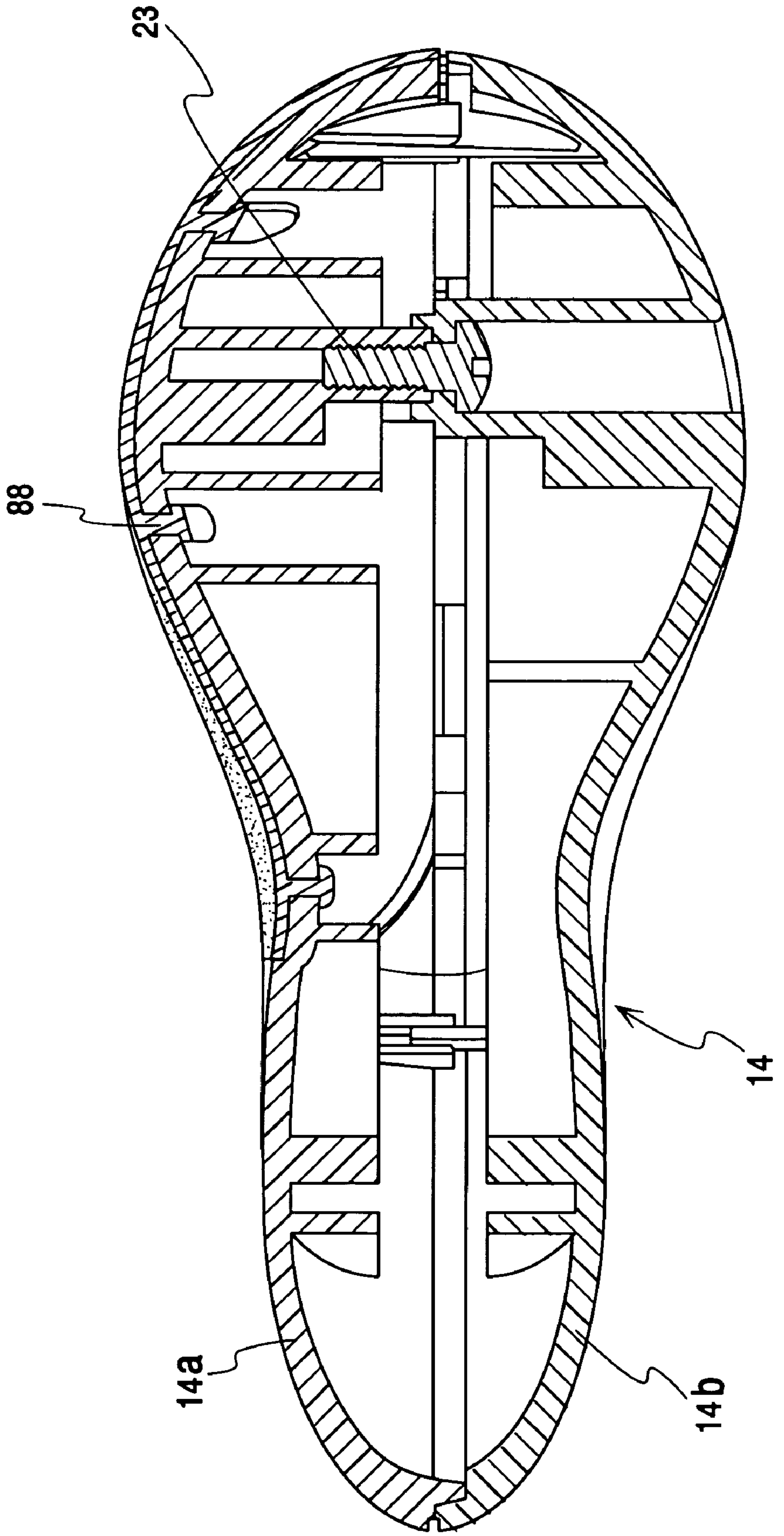
FIG. 12 is a cross-sectional view of a portion of the power tool of FIG. 1 taken along line 12—12 in FIG. 11.

As illustrated in FIGS. 6, 9 and 10, the motor 28 is fastened to the lower housing 22 via mounting plate 30, and is mechanically connected to the pad 16 such that it is capable of driving the pad 16 in an orbital path below the housing 12. More particularly, a motor output shaft 28*a* is connected to and rotates counterweight 38 about a z-axis defined by the shaft 28*a*. The pad 16 is connected to counterweight 38 such that rotation of counterweight 38 causes a corresponding rotation of the pad 16 about the z-axis.

Figure 3:
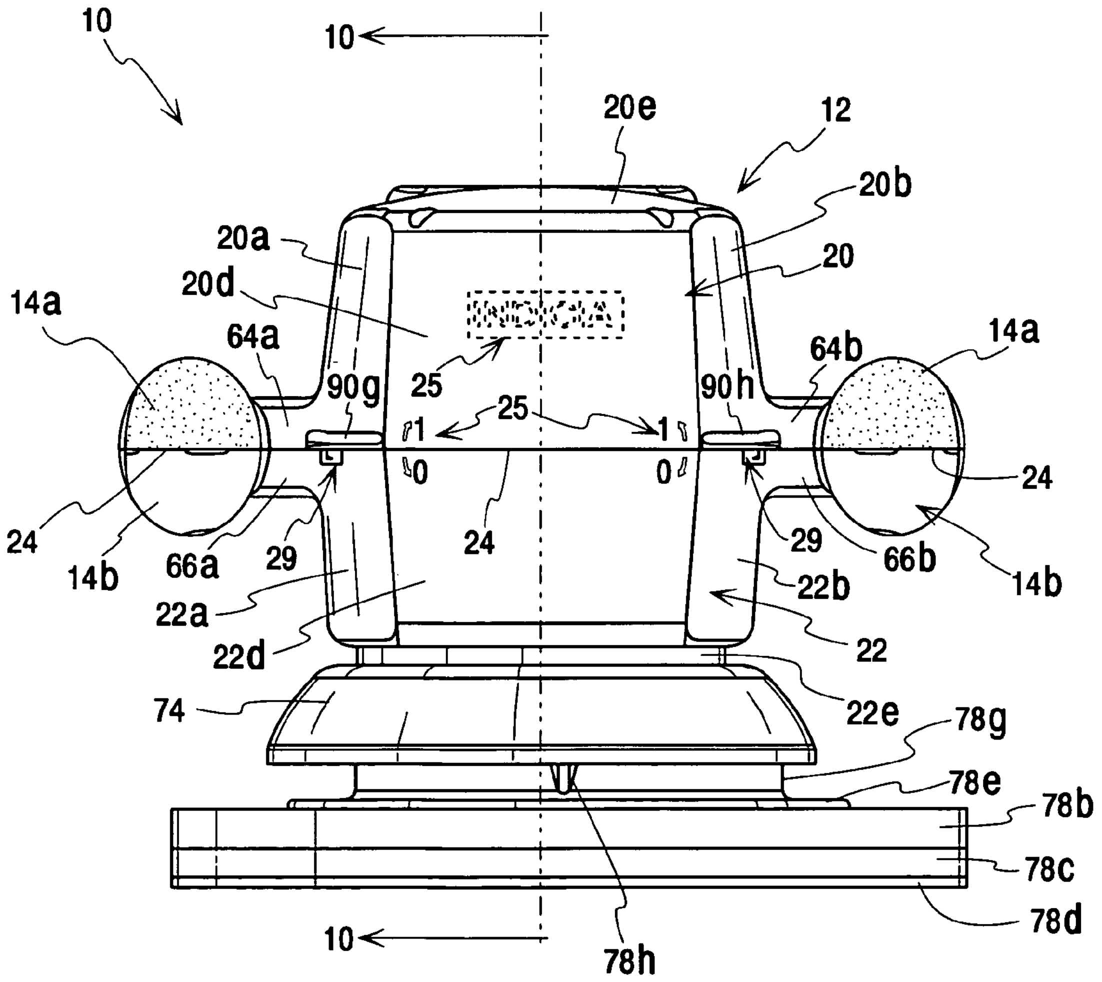
FIG. 3 is a front elevational view of the power tool of FIG. 1.
Figure 5:
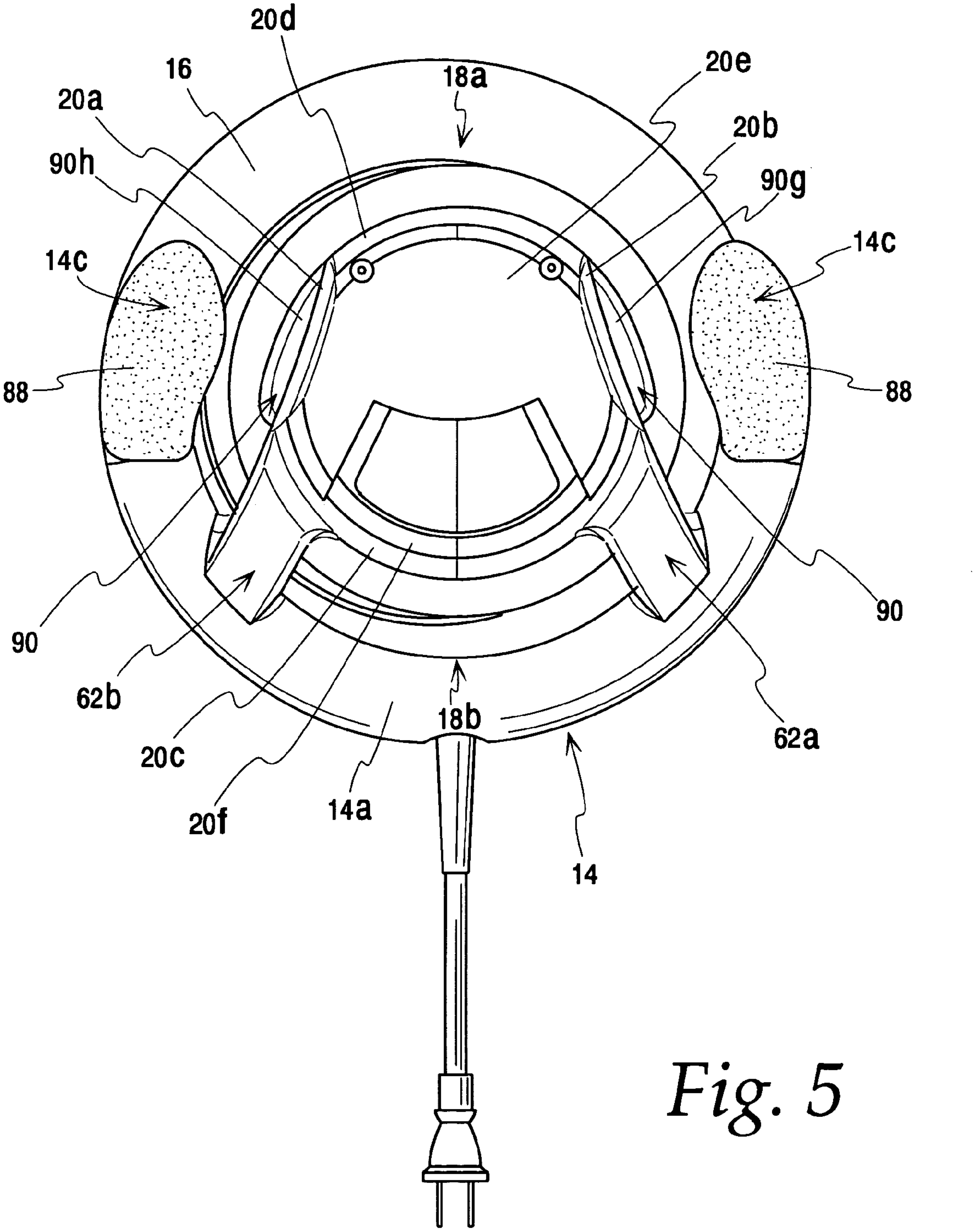
FIG. 5 is a top plan view of the power tool of FIG. 1.

As illustrated in FIGS. 3 and 5, the upper housing shell 20 is generally arcuate in shape, with the exception of two generally planar side walls 20*a–b* that taper in towards one another at the front of the tool 18*a* in a manner generally keeping with the lines created by the bridging members 62*a–b* (which will be discussed further below). The tapered side walls 20*a–b* result in the upper housing portion 20 having an arcuate rear wall 20*c* that is larger than the arcuate front wall 20*d* and also increase the spacing between the upper housing portion 20 and the handle 14 so that an operator can more easily grip the tool 10. The increased space between the handle 14 and the housing 12 provides the tool 10 with a larger gripping area and allows for an actuator, such as actuator 90 (see FIG. 5), to be positioned between the housing 12 and the handle 14. Accordingly, the tool can more easily be actuated while maintaining a two-handed grip about its handle. The front wall 20*d* of the upper housing portion 20 provides ample room for placing indicia 25 such as operational instructions (e.g., on/off symbols) and/or brand names or trademarks so that consumers can easily operate the tool 10 and/or readily identify the tool's source of origin.

The top surface 20*e* of upper housing portion 20 is slightly arcuate in a convex manner and provides a raised wall portion 20*f* near the rear of the housing which defines a vent or passage to the cavity 26, such as the elongated slot opening 20*g* illustrated in FIG. 1. The wall portion 20*f* curves along the periphery of the top surface 20*e* so that it remains flush with the rear wall 20*c* of the upper housing 20, and has gusset members 20*h–i* extending forward from the ends of the wall portion 20*f*. The gusset members 20*h–i* angle toward one another as they extend toward the front 18*a* of the unit 10, and taper toward the top surface 20*e* as they extend toward the front 18*a* of the unit 10 until eventually becoming flush with the top surface 20*e*. The edges of the upper housing 20 are arcuate to provide a smooth transition between surfaces of the housing.

As illustrated in FIGS. 3 and 9–11, the lower housing shell 22 is generally bowl-shaped and has surfaces or wall members corresponding to those of the upper housing shell 20 discussed above. More particularly, the lower housing member 22 is generally arcuate in shape with tapered side walls 22*a–b* and arcuate rear and front walls 22*c–d*, respectively. In addition, the lower housing 22 includes a generally planar bottom wall 22*e*, which defines an opening 22*f* through which an upstanding circular wall of the mounting plate 30 extends.

The lower housing 22 further defines a socket 27 for receiving at least a portion of actuator 90. More specifically, as illustrated in FIG. 6, the inner surface of rear wall 22*c* forms a generally rectangular shaped socket 27 into which switch 90*a* is positioned. In the embodiment illustrated, switch 90*a* consists of a pushbutton switch which is a Push On-Push Off type switch, such as pushbutton switch model No. J188B manufactured by Judco Manufacturing Inc. of Harbor City, Calif. The switch 90*a* regulates power supplied to the motor 28 and is movable between an active position, or "on" state, to allow power to the motor 28 and a de-active position, or "off" state, to generally prohibit power to the motor 28. The socket 27 has a notch or groove 27*a* on a side thereof in order to accommodate the terminals and wires connected to and extending out of the side of the switch 90*a* so that the switch may be nested squarely in the socket 27.

Figure 7:
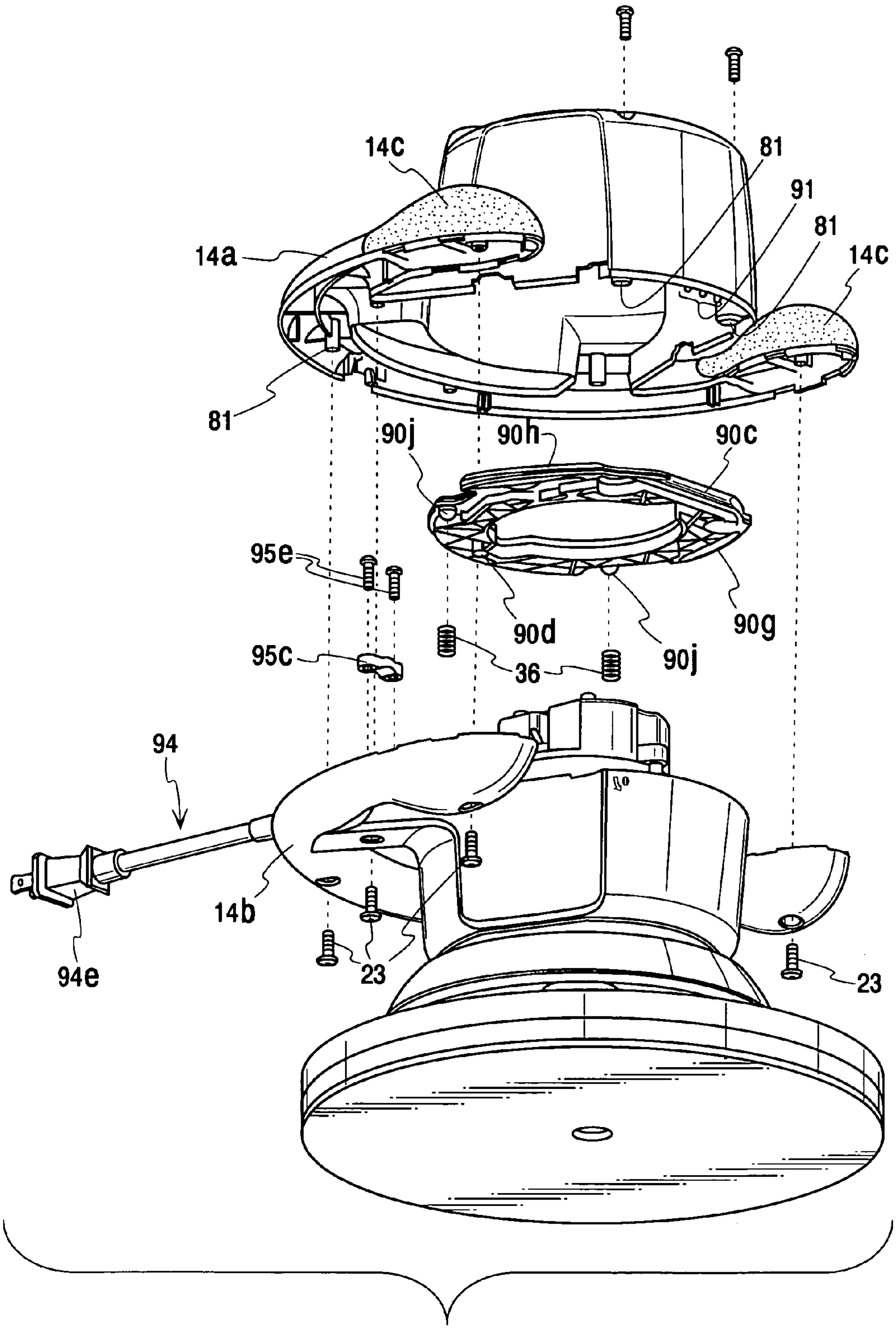
FIG. 7 is an exploded view of the power tool of FIG. 1 showing a portion of a switch assembly in accordance with the present invention.

The switch 90*a* is actuated between active and de-active positions via a lever 90*b*. The lever 90*b* preferably is generally ring shaped with a pivot member such as bar 90*c* located on one side and a switch engaging surface 90*d* located on the side opposite bar 90*c*. The bar 90*c* rests in a support member, such as collar 90*e* (FIG. 10), which allows the lever 90*b* to be pivoted about a longitudinal axis defined by the bar 90*c*. The collar 90*e* is made up of a plurality of ribs such as gusset members 90*f* extending from the inner surfaces of the front and top wall 20*d–e* of upper housing shell 20 and from the inner surfaces of the front and bottom wall 22*d–e* of lower housing shell 22. As illustrated in FIGS. 6, 7 and 10, the gussets 90*f* extending from the front of the upper housing form an upper crutch 91 for bar 90*c*, and the gussets 90*f* extending from the front of the lower housing form a lower crutch 93 for bar 90*c*. In a preferred embodiment, the upper and lower crutches 91 and 93, respectively, are staggered so that an upper crutch 91 is not positioned directly over a lower crutch 93 and vice versa. In alternate embodiments, however, the crutches 91 and 93 maybe aligned if desired.

The lever 90*b* also has operators, such as paddle-like extensions, 90*g–h* that generally extend out from opposing sides of the lever 90*b* and through passages 29 (see FIG. 3) in housing 12. The paddle-like extensions 90*g–h* have an elongated shape to provide an operator with both a range of locations to engage the paddle and a range of locations about the handle from which to operate the actuator 90. The paddles 90*g–h* are separated from the main portion of lever 90*b* via posts 90*i* (see FIG. 11). More particularly, the posts 90*i* extend through passages 29 created by notches in the upper and lower housing portions 20 and 22 along the parting line 24, leaving the paddle portions 90*g–h* exposed outside of the cavity 26 proximate to the ends 14*c* of the handle 14. This enables an operator to actuate the tool 10 with either hand and from either side of the tool housing 12, while maintaining a two handed grip on the handle 14. The passages 29 are generally rectangular in shape and provide ample room for the lever 90*b* to move upward and downward as required to actuate the switch 90*a*.

The lower housing shell 22 includes pedestals 35*a–b* to support biasing members, such as springs 36. A third pedestal 35*c* is also included to support additional electronic circuitry or components, such as a rectifier 37. The preferred pedestals 35 are posts extending upward from the inner surface of bottom member 22*e* and are integral with the lower housing portion 22. The top portion of each pedestal 35*a–b* defines a recess for receiving a portion of the coil spring 36. The top surface of pedestal 35*c* defines a bore for receiving a screw 37*a* to secure the rectifier 37 thereto. The other end of springs 36 are connected to the lever 90*b* via spring securing mechanisms, such as bosses 90*j*. The preferred bosses 90*j* are rounded studs projecting downward from the lower surface of the lever 90*b*. The bosses 90*j* are disposed within the end of the coil springs 36. That is, the ends of each of the springs 36 form a sleeve that extends over at least a portion of the boss 90*j*. This allows the lever 90*b* to compress the springs 36 between the lower surface of lever 90*b* and the upper surface of pedestals 35*a–b* without shifting and other displacement of the spring 36*s*. The springs 36 bias the lever 90*b* away from the switch 90*a* but allow the lever 90*b* to be pressed into contact with the pushbutton 90*a* when desired by the operator. Thus, the operator may activate or deactivate the tool 10 by pressing downward on either (or both) of the paddle extensions 90*g–h* causing the lever 90*b* to pivot about bar 90*c* and compress the springs 36 so that the switch engaging surface 90*d* engages the pushbutton switch 90*a*, thereby turning the tool on and off. Once released, the springs 36 return the lever 90*b* to its biased upper position away from engagement with the switch 90*a*.

As illustrated in FIGS. 6 and 9, the motor 28 and mounting plate 30 are secured to the lower housing portion 22 by screws 33. The screws 33 each extend through one of the bores 32 situated at the corners of the mounting plate 30 and into threaded inserts 34 pressed into the lower wall 22*a* of the lower housing portion 22. Sandwiched between the lower wall 22*a* and the upper surface of the mounting plate 30 is a mounting portion of an arcuate shield or skirt member 74, which forms an annular wall about the mounting plate 30 and at least a portion of counterweight 38. The shield 74 has a flat top portion 74*a* with a ridge 74*b* extending downward therefrom which forms an alignment wall about at least a portion of the mounting plate 30. More particularly, the ridge 74*b* is generally rectangular in shape and aids in preventing the mounting plate 30 from rotating.

The mounting plate 30 is generally rectangular in shape and includes tabs 30*a–b* which extend outward and upward from opposing side portions of the plate 30. The tabs 30*a–b* define bores into which elongate screws 31 are thread in order to mount and secure the motor 28 to the mounting plate 30. The tabs 30*a–b*, like the ridge 74*b* in mounting plate 30, aid to align and secure the motor 28 and mounting plate 30 in position when the motor 38 is inserted into the openings 74*c* and 22*f* defined by the top portion 74*a* of the shield 74 and the lower wall 22*a* of the lower housing portion 22, respectively. For example, the tabs 30*a–b* must be inserted into correspondingly shaped grooves or notches 75 in the top 74*a* of shield 74 and in the bottom wall 22*e* of housing 12 in order for the motor 28 to be properly aligned in the cavity 26. The tabs 30*a–b* prevent the motor 28 from rotating once in position so that maximum torque may be supplied to the work element, such as pad 16.

As illustrated in FIGS. 7, 8, 10 and 11, a plurality of support gussets 79 and hollow posts 81 also extend from the upper and lower housing portions 20 and 22. The support gussets 79 from the upper housing 20 engage the motor 28 in cavity 26 to support and reduce unintentional vibrational movement. The gussets 79 from the lower housing, along with additional gussets from the upper housing, support the walls of the housing 12 and the hollow posts 81. The hollow posts 81 are internally threaded and are used to secure the housing portions 20 and 22 together and hold the support gussets 79 of the upper housing 20 against motor 28. With this configuration, the internal mechanisms of the tool 10, such as the motor 28, are held securely in position, thereby reducing the occurrence of undesirable vibration during operation.

Figure 2:
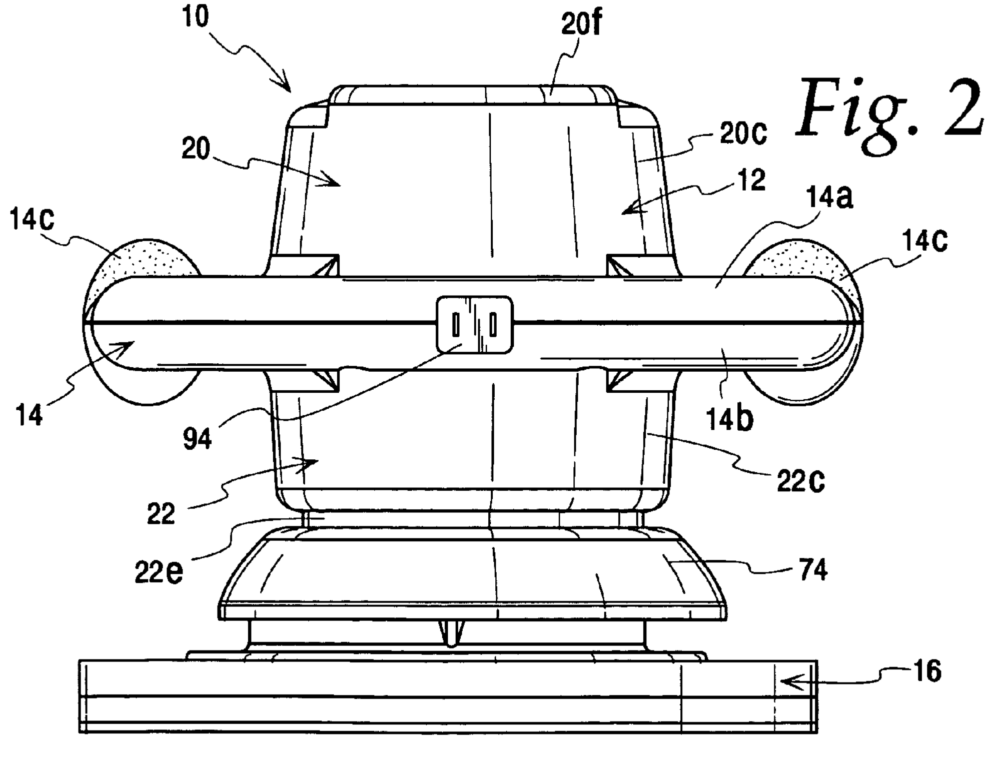
FIG. 2 is a rear elevational view of the power tool of FIG. 1.
Figure 4:
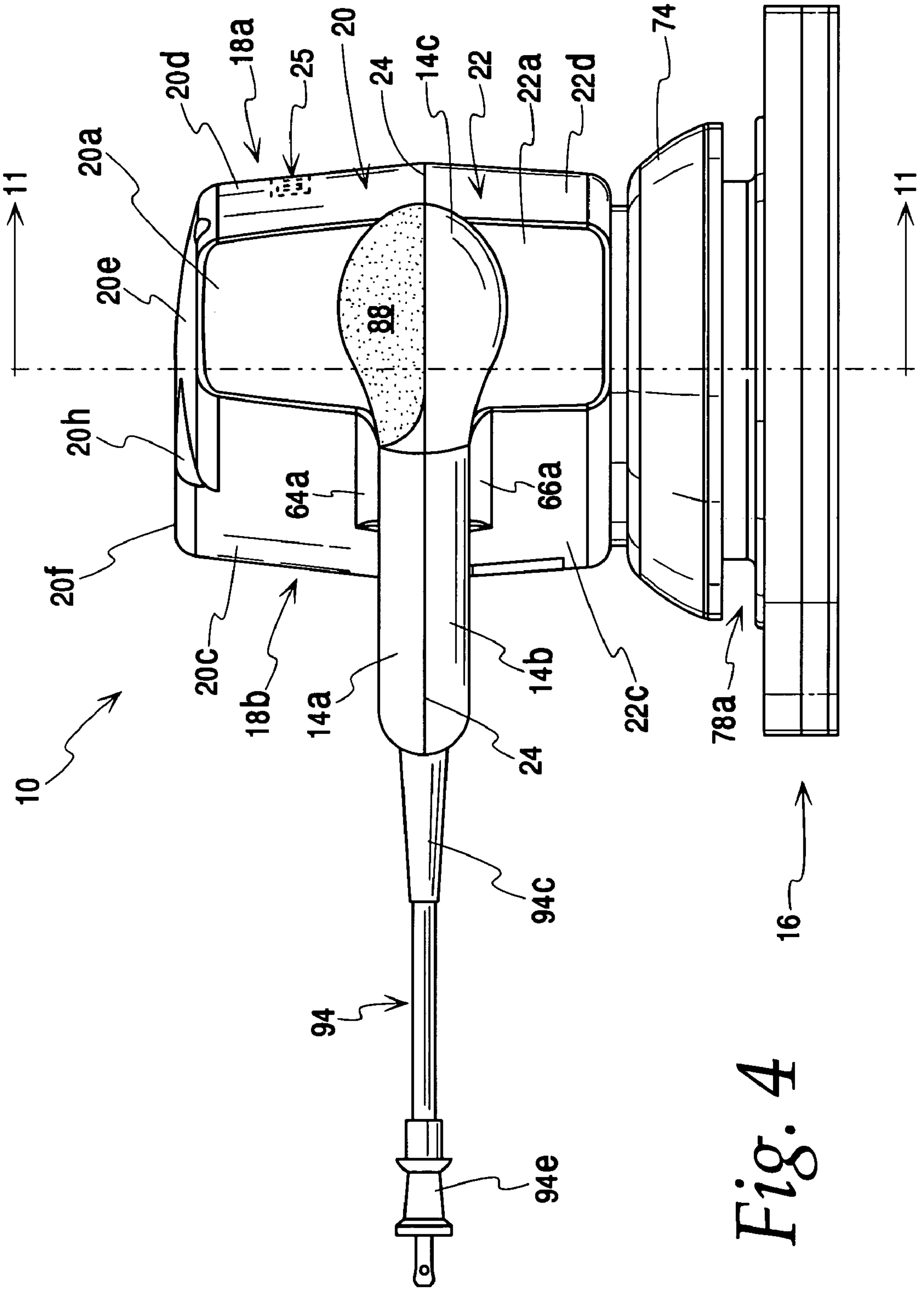
FIG. 4 is a right side elevational view of the power tool of FIG. 1.

The handle 14 has a generally circular cross-section and is generally U-shaped about the housing 12 to provide the operator with a plurality of gripping locations to facilitate an effective two-handed grip to maintain control over the tool 10. More particularly, upper and lower handle portions 14*a* and 14*b* connect along the parting line 24 and are secured together by screws 23 or other fasteners which are inserted into recessed bores located in the lower portion 14*b* of the handle 14. The handle 14 is preferably parallel to the work element 16, as illustrated in FIGS. 2–4. In addition, the ends 14*c* of the handle 14 are enlarged with respect to the remainder of the handle and have an outer elastomer surface or grip 88 to facilitate enhanced gripping for control over the tool 10. For example, as shown in FIG. 4, the lower and upper surfaces of the handle end 14*c* are arcuate in a convex manner to provide an enlarged gripping surface or enlarged handle portion. In addition, the surface area of the handle ends 14*c* facing the housing 12 may also be arcuate in a convex manner, as illustrated in FIG. 5, in order to provide a bulb or ball-shaped handle end.

The enlarging of the handle ends 14*c* provides the operator with a multi-dimensional handle which offers greater control over the tool than conventional handle designs. For example, the enlarged ends 14*c* offer increased surface area on the handle thereby allowing the operator to use more of his or her hand to grip the tool and maintain a stronger grip. The enlarged ends 14*c* also allow the operator to maintain a forward grip on the end of the handle, which can assist the operator in drawing the tool 10 back towards the operator when working on a workpiece.

The enlarged ends 14*c* also allow the operator to "feel" the ends of the handle without the need to visually locate them. This allows the operator to focus more on the workpiece rather than requiring the operator to break visual contact with the workpiece to determine where the ends of the handle 14 are. For example, the enlarged ends 14*c* also provide the operator with a structural end stop for the handle. Furthermore, the enlarged ends 14*c* position the operators hands when grasped in locations which are generally centrally-balanced with respect to the tool 10 and generally balanced about the tools center of gravity. Another benefit associated with the enlarged ends 14*c* is that they provide the user with a variety of handle sizes to choose from so that different sized hands can be accommodated. The elastomer grip 88 is provided on the upper portion 14*a* of handle 14 to facilitate enhanced gripping control over the power tool 10. The elastomer grip is preferably added by way of an injection overmolding process. More particularly, the handle 14 is preferably formed by a plastic injection molding process, which is later followed by injection of a grip layer material to form grip 88. A preferred material for the elastomer grip is an elastomer/plastic blend, such as, for example, SANTOPRENE, which is a product of Advanced Elastomer Systems, L.P. of Akron, Ohio. The overmolded grip may be formed with a smooth outer surface or with a textured outer surface and provides a non-slip rubber (or rubber-like) gripping surface for the operator's hand to grasp. Preferably, the operator will grip the ends 14c of the handle 14 with his or her palm covering the grip 88 on the upper handle portion 14a and his or her fingers and thumb wrapping around the handle to grasp the lower handle portion 14b of the handle end 14c. Alternatively, however, the operator may grasp the handle along any of the plurality of locations about the U-shaped handle. Furthermore, additional portions of the handle 14 (or the entire handle) may be covered with an elastomer overmolding. For example, an overmolded grip portion may be included in the rear of the unit and/or on the lower handle portion 14a.

It should be understood that other materials may be used for the overmolding portions. For example, other thermal plastic elastomers or elastomer/plastic blends, such as rubber, nylon, butyl, EPDM, poly-trans-pentenarmer, natural rubber, butadiene rubber, SBR, ethylene-vinyl acetate rubber, acrylate rubber, chlorinated polyethylene, neoprene and nitrile rubber, may also be used for the overmolded grip 88. Another material which may be used for the overmolding is HERCUPRENE, which is manufactured by the J-Von company of Leominster, Mass.

It should also be understood that alternate embodiments of the apparatus may be provided with no elastomer overmolding whatsoever. For example, the tool 10 may be provided with a simple smooth plastic handle, or a textured plastic handle, created from a traditional plastic injection molding process. More particularly, the overmolding may be replaced with a textured surface, such as Rawal #MT-11605, a mold texturization process provided by Mold-Tech/Rawal of Carol Stream, Ill. Similarly, other mold texturization processes may be used to create a variety of textured surfaces.

As illustrated in FIGS. 2 and 3, the handle 14 is connected to the upper and lower housing shells 20 and 22 of the housing 12 by two spoke-like members 62a and 62b. The spokes 62a–b are generally rectangular in cross-section and have a generally hollow interior to conserve on material cost and reduce the overall weight of the tool 10. The preferred spokes 62a–b extend integrally from the upper and lower housing shells 20 and 22 of the housing 12 and, thus, are separated into upper and lower portions 64a–b and 66a–b by parting line 24. The upper spoke portions 64a–b are integrally connected to upper housing shell 20 and upper handle portion 14a, and the lower spoke portions 66a–b are integrally connected to lower housing shell 22 and lower handle portion 14b. Each spoke portion can include webing for structural support and integrity.

Figure 8:
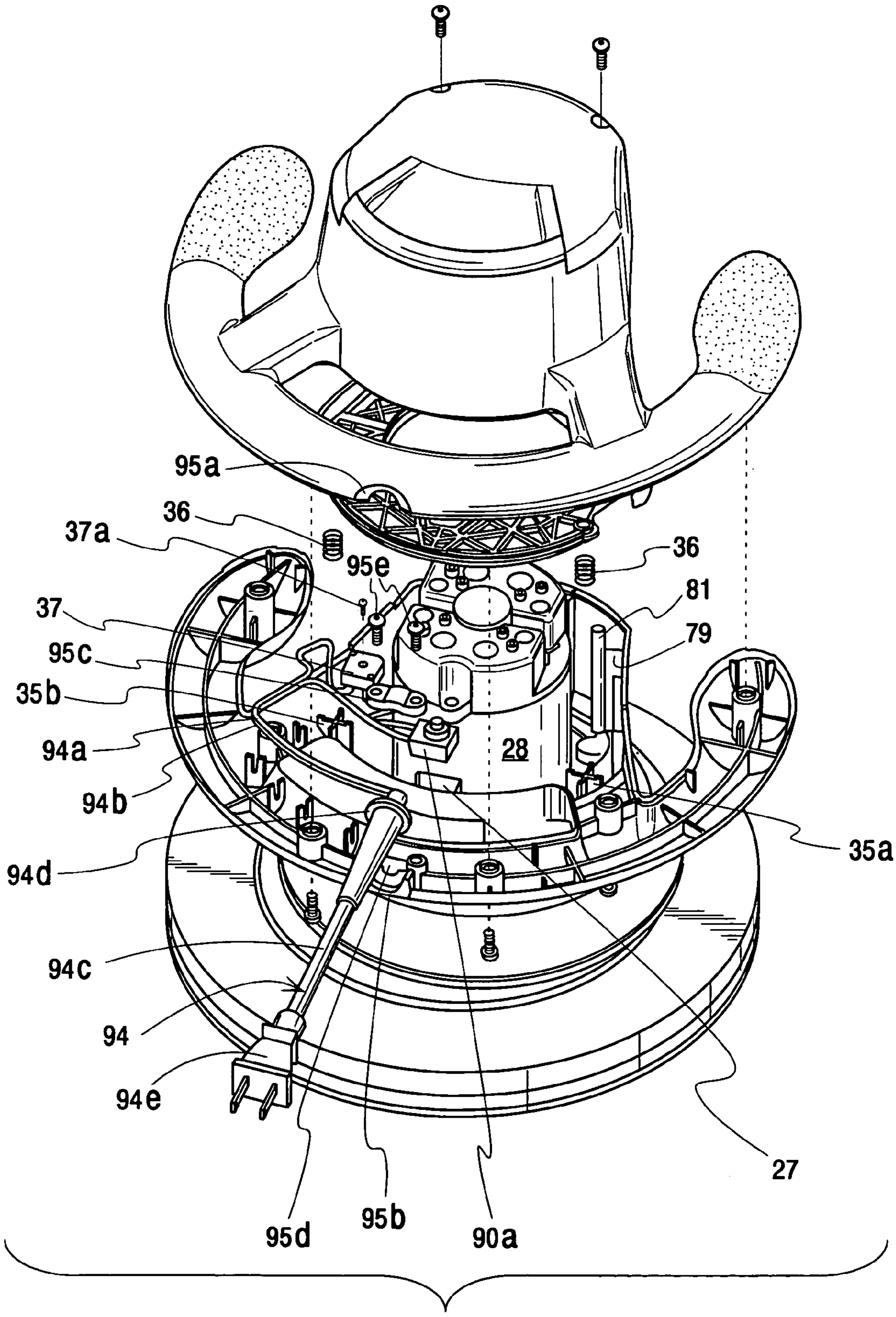
FIG. 8 is an exploded view of the power tool of FIG. 1 illustrating a cord lock used in accordance with the present invention.

As illustrated in FIGS. 6 and 8, the rear portion of handle 14 includes a power cord 94 for supplying power to the tool 10 (i.e., for supplying power to the apparatus from a power supply external to the power tool). Preferably, the power cord 94 has two conductive wires 94a–b with shielding, and an outer insulator jacket 94c (e.g., a double insulation wiring configuration). The rear handle portions 14a–b include semi-circular notches 95a–b, which combine to form a strain relief 95 for the power cord 94. More particularly, the notches 95a–b are each U-shaped and together form a rounded collar about a flange portion 94d of the insulator jacket 94c. This assists to prevent the power cord 94 from being separated from the housing 12. The preferred strain relief 95 also includes a clamp mechanism, such as block 95c (which has a curved bottom surface and bores located on opposite ends). The power cord rests in a curved cradle 95d and the block 95c is fastened down over the power cord 94 via screws 95e to clamp the power cord 94 in the cradle 95d, with the curved surface of the block 95c engaging and compressing the outer jacket 94c in order to provide additional strain relief of the power cord 94. One end of the power cord 94 includes an electrical connector, such as male plug member 94e, which can be connected to various types of power supplies, either directly or via an extension cord (not shown). On the other end of the power cord 94, wire 94a is connected to a terminal of the full wave rectifier 37, and wire 94b is connected to a terminal of the pushbutton switch 90a. A second terminal of the pushbutton 90a is electrically connected to a terminal on the motor 28, and a second terminal on the rectifier 37 is electrically connected to a second terminal on the motor 28 in order to complete the electrical circuit between the power supply, rectifier 37, motor 28 and actuator 90. Thus, when the actuator 90 is placed into the "on" position, power will be supplied to the motor 28 in order to drive the work element 16 connected to the tool 10. When the switch 90 is placed into the "off" position, no power will be supplied to the motor 28, and the apparatus will remain in an inoperative or de-active state.

The hollow design of the body 12, spokes 62a–b and handle 14 allow for a variety of alternate embodiments and wiring configurations to be made. For example, the actuator 90 may be located in either of the spokes 62a–b or in a portion of the handle 14. As another alternative, the power cord 94 may be directly connected to the housing 12 of the tool 10 rather than the handle 14.

Figure 13:
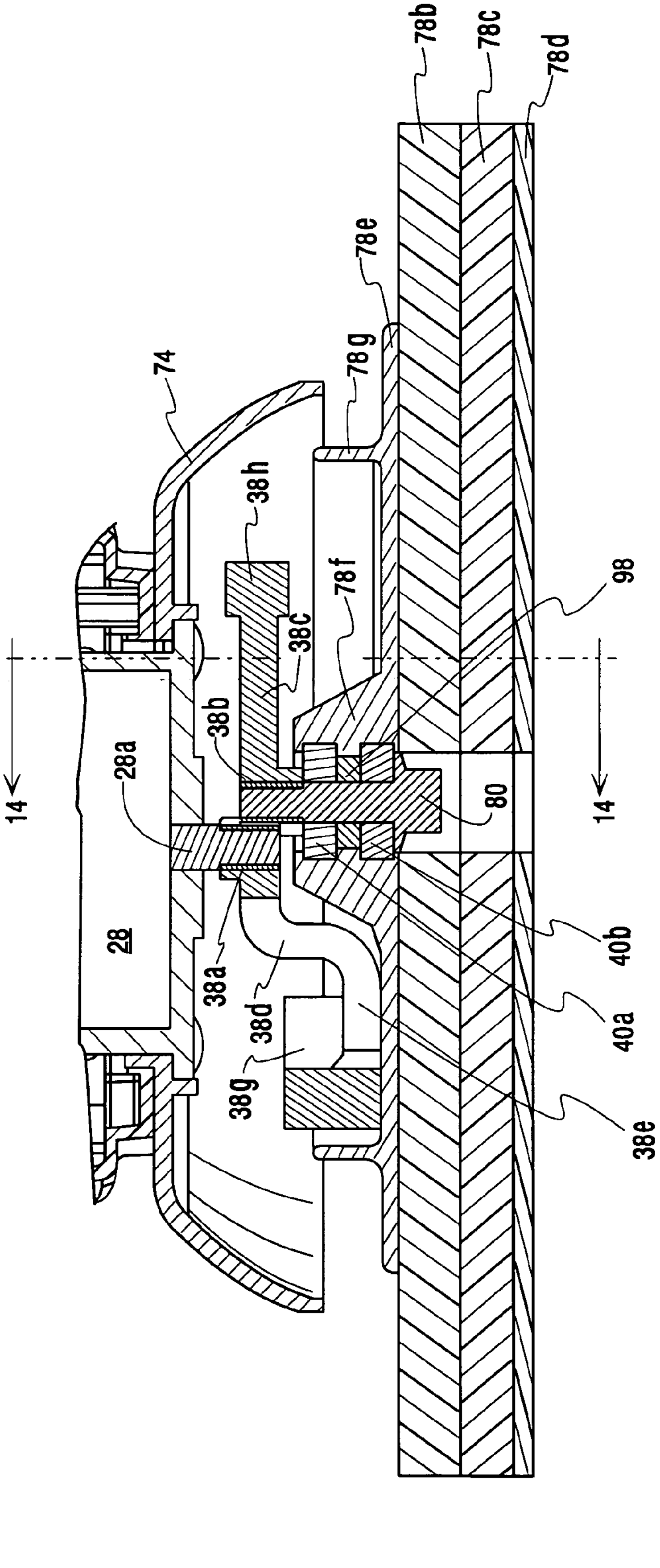
FIG. 13 is an enlarged partial cross-sectional view of the lower tool assembly of the power tool of FIG. 1 illustrating a counterweight, shield and pad assembly in accordance with the present invention.
Figure 14:
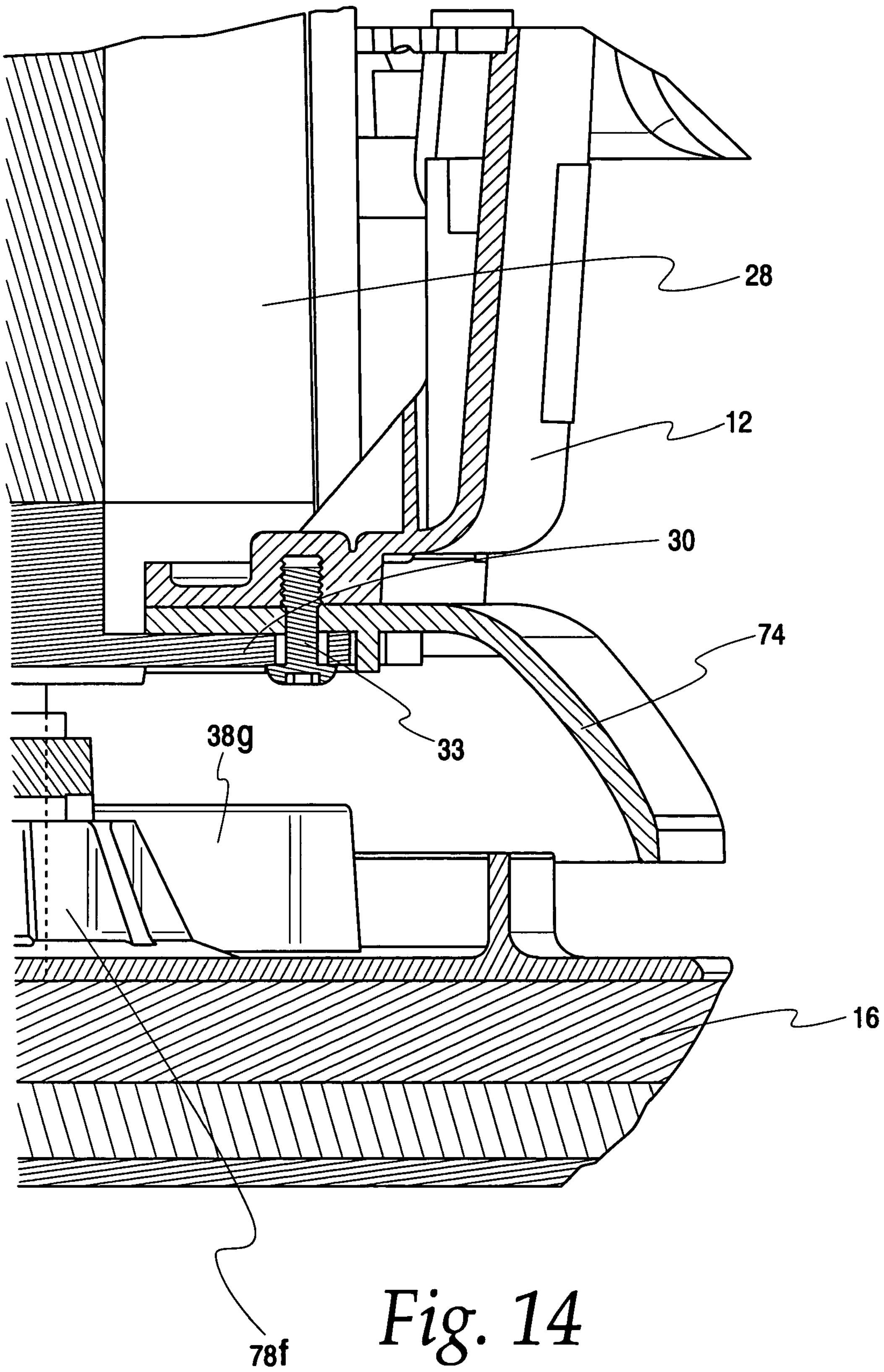
FIG. 14 is an enlarged partial cross-sectional view of the lower tool assembly of the power tool of FIG. 1 taken along line 14—14 in FIG. 13.

Referring now to FIGS. 10 and 13, the motor output shaft 28a extends through the shield member 74 and is threaded into a first bore 38a defined by the counterweight 38. The counterweight 38 is connected to the pad assembly 78 by a bolt, such as left handed bolt 80, which threads into a second bore 38b in the counterweight 38. The second counterweight bore 38b is parallel to, and located generally adjacent to, the first counterweight bore 38a. Thus, rotation of the output shaft 28a results in a corresponding rotation in the counterweight 38 and the pad assembly 78 connected thereto.

As illustrated in FIGS. 10, 11, 13 and 17–19, the pad assembly 78 preferably consists of a pad support 78a, a first pad 78b, a second pad 78c, and a third pad 78d. The pads 78b–d are overlaid and connected to one another and to the pad support 78a by an adhesive 76 (FIG. 19) and, preferably, include a closed polyethylene pad, an ether foam pad, and a closed micro-cell polyethylene pad, respectively. The preferred pads 78b–d have a thickness of ½", ⅜" and ⅛" respectively, and a density of 2 $lb/ft^3$ each. The pad support 78a has planar disc portion 78e supporting a generally frusto-conical portion 78f extending upward from the middle and an annular wall 78g extending upward from the disc portion 78e about the generally frusto-conical portion 78f. The generally frusto-conical portion 78f preferably consists of a central column portion with a plurality of gusset members extending from the sides thereof. The annular wall 78g is positioned intermediate of the outer perimeter of the disc 78e and the generally frusto-conical portion 78f and, preferably, about two-thirds of the radial distance from the center of the disc 78e toward the perimeter of the disc 78e. Thus, as mentioned above, the counterweight 38 rotates within the annular wall 78g of the pad support 78a, and the annular wall 78g remains under cover of the shield 74. The skirt member 74 and the annular wall 78g of the pad support 78a combine to prevent direct access to the counterweight 38.

The generally frusto-conical portion 78f of pad support 78a has a hollow center region that houses bearings 40a–b and a spacer 98. The bolt 80 passes through the central openings in the bearings 40a–b and the spacer 98 and is threaded into the second bore 38b of the counterweight 38.

The first pad 78*b*, the second pad 78*c* and the third pad 78*d* also have central openings or passageways through which the bolt 80 passes in order to be threaded into the counterweight 38. The end of bolt 80 includes an enlarged head to secure the pad assembly 78, including bearings 40*a* and 40*b* and spacer 98, to the tool 10. During operation, the pad 14 will be orbitally rotated about the z-axis of the tool (defined by output shaft 28*a*) when the motor 28 drives the shaft 28*a* and the counterweight 38.

For maintenance purposes, at least one small opening or notch 78*h* may be defined by the annular wall 78*g* of the pad support 78*a* so that a hand tool or other instrument can be inserted into the interior region between the pad support 78*a* and the skirt member 74 to prevent the counterweight 38 from rotating while the bolt 80 is being unscrewed and removed from the counterweight 38. This enables the pad assembly 78 to be removed from the tool 10 for access to the counterweight 38 and the screws and bolts connecting the skirt member 74 and other internal components (e.g., the motor 28, rectifier 37, etc.) in the housing 12. Such access may be required to repair or replace parts, including the pad assembly 78 or those parts internal to the housing 12, the spokes 62*a*–*b* and the handle 14.

Figure 20:
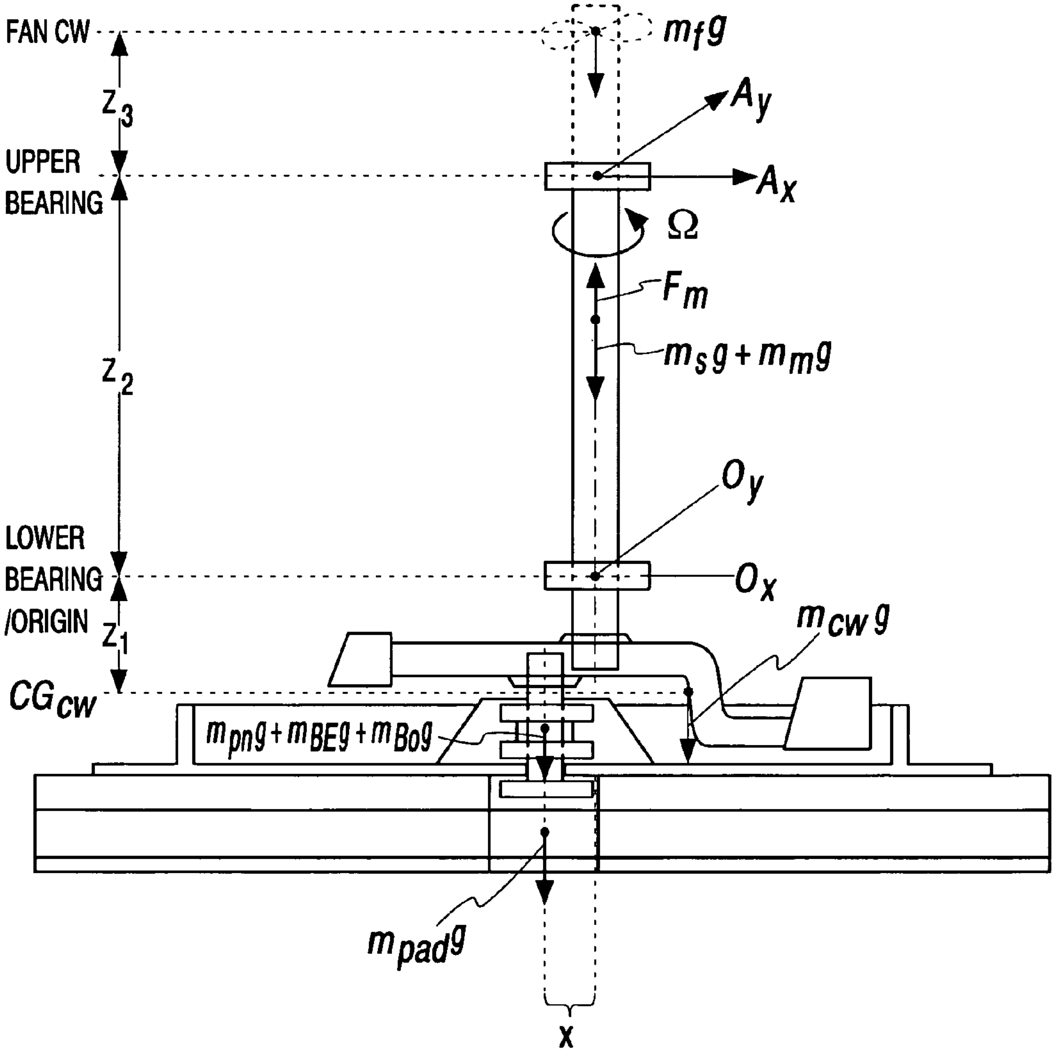
FIG. 20 is a cross-sectional view of a motor shaft, counterweight and pad assembly which embody the features of the present invention and illustrates forces which may be accounted for in a dynamically balanced apparatus.

As mentioned above, the tool 10 is preferably statically and dynamically balanced in order to provide a tool 10 that is balanced both at rest and in operation, and in order to reduce the vibration experienced when the counterweight 38 and pad assembly 78 are in motion. An illustration of the components and forces associated with the power tool 10 is illustrated in FIG. 20. Each component of the power tool 10 has a calculable mass, density and center of gravity and can be statically and dynamically balanced in a manner characterized by the following equations. For example, the tool 10 may be statically balanced so that the masses and centers of gravity for the tool components attached to the counterweight via bolt 80 are balanced about the z-axis of the tool which is defined by motor output shaft 28*a*. In a preferred embodiment, for example, the tool 10 is statically balanced in a manner characterized by the following equations:

$$m_{system}r_{system}=m_{CW}r_{CW}+m_{PH}r_{PH}+m_{PAD}r_{PAD}+m_{BO}r_{BO}=0$$

or $$m_{system}x_{system}=m_{CW}x_{CW}+m_{PH}x_{PH}+m_{PAD}x_{PAD}+m_{BO}x_{BO}=0$$

$$m_{system}y_{system}=m_{CW}y_{CW}+m_{PH}y_{PH}+m_{PAD}y_{PAD}+m_{BO}y_{BO}=0$$

wherein m denotes mass, subscript items CW, PH, PAD and BO denote the counterweight 38, pad holder 78*a*, pad 78*b*–*d*, and pad assembly bolt 80, respectively, r denotes a distance from the subscript item's center of gravity to the z-axis defined by motor output shaft 28*a*, and x and y denote a distance between the subscript items center of gravity coordinates from the z-axis. Thus, the counterweight 38 aids to offset the effects the pad assembly 78 and bolt 80 have on the output shaft 28*a* so that the tool 10 remains statically balanced.

The power tool 10 may also be dynamically balanced so that the angular momentum of the system is parallel to the axis of rotation (or z-axis). More particularly, the tool 10 may be dynamically balanced by determining the sum of moments about a point of origin, referred to hereinafter as point "O." In a preferred embodiment, and as illustrated in FIG. 20, the tool 10 has a motor with an upper and lower bearing, and the origin is set at the lower motor bearing. The sum of moments about O is then characterized by the equation:

$$\Sigma M_O = I_{yz}\omega_z^2 i - I_{xz}\omega_z^2 j = I_{yz}\Omega^2 i - I_{xz}\Omega^2 j$$

and the net inertia forces $I_{yz}$ and $I_{xz}$ are set equal to zero $((Ix_O z_O)_{system}=(Iy_O z_O)_{system}=0)$ in order to have no net moment on the system (i.e., dynamically balanced). Therefore, in a preferred embodiment, the tool 10 is dynamically balanced as characterized by the following equations:

$$(Ix_O z_O)_{system}=(Iy_O z_O)_{system}=0$$

$$I_{X_O Z_O}=I_{X^{CW}Z^{CW}}+m_{CW}x_{CW}z_{CW}+I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}=0$$

$$I_{Y_O Z_O}=I_{Y^{CW}Z^{CW}}+m_{CW}y_{CW}z_{CW}+I_{Y^{PH}Z^{PH}}+m_{PH}y_{PH}z_{PH}+I_{Y^{PAD}Z^{PAD}}+m_{PAD}y_{PAD}z_{PAD}+I_{Y^{BO}Z^{BO}}+m_{BO}y_{BO}z_{BO}=0$$

wherein I denotes inertia and O is a moment center taken at a point of origin, and the dynamically balanced equation denotes that a net product of inertia of the pad assembly about point O, is equal to zero for being dynamically balanced. In the latter equation, $I_{Y_O Z_O}$ is approximately equal to zero.

If desired, these equations can be altered to take into account more or less components of the power tool so that the tool may be modeled, analyzed and further balanced as desired. For example, the equations may be altered to take into account the pad assembly bearings 40*a*–*b*, spacer 98 and adhesive 76 in order to more accurately model and further balance the tool 10. If this is undertaken, the static balance of the tool may be characterized by the equations:

$$m_{system}r_{system}=m_{CW}r_{CW}+m_{PH}r_{PH}+m_{PAD}r_{PAD}+m_{BO}r_{BO}+m_{BE}r_{BE}+m_{SP}r_{SP}+m_{AD}r_{AD}=0$$

or $$m_{system}x_{system}=m_{CW}x_{CW}+m_{PH}x_{PH}+m_{PAD}x_{PAD}+m_{BO}x_{BO}+m_{BE}x_{BE}+m_{SP}x_{SP}+m_{AD}x_{AD}=0$$

$$m_{system}y_{system}=m_{CW}y_{CW}+m_{PH}y_{PH}+m_{PAD}y_{PAD}+m_{BO}y_{BO}+m_{BE}y_{BE}+m_{SP}y_{SP}+m_{AD}y_{AD}=0$$

and the dynamic balance may be characterized by the equations:

$$(Ix_O z_O)_{system}=(Iy_O z_O)_{system}=0$$

$$I_{X_O Z_O}=I_{X^{CW}Z^{CW}}+m_{CW}x_{CW}z_{CW}+I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}+I_{X^{BE}Z^{BE}}+m_{BE}x_{BE}z_{BE}+I_{X^{SP}Z^{SP}}+m_{SP}x_{SP}z_{SP}+I_{X^{AD}Z^{AD}}+m_{AD}x_{AD}z_{AD}=0$$

$$I_{Y_O Z_O}=I_{Y^{CW}Z^{CW}}+m_{CW}y_{CW}z_{CW}+I_{Y^{PH}Z^{PH}}+m_{PH}y_{PH}z_{PH}+I_{Y^{PAD}Z^{PAD}}+m_{PAD}y_{PAD}z_{PAD}+I_{Y^{BO}Z^{BO}}+m_{BO}y_{BO}z_{BO}+I_{Y^{BE}Z^{BE}}m_{BE}y_{BE}z_{BE}+I_{Y^{SP}Z^{SP}}+m_{SP}y_{SP}z_{SP}+I_{Y^{AD}Z^{AD}}+m_{AD}y_{AD}z_{AD}=0$$

wherein subscript items BE, SP, and AD denote the pad assembly bearings 40*a*–*b*, spacer 98, and adhesive 76, respectively. The equations may also be modified to take into account accessories which are used with the tool such as bonnets. In alternate embodiments, however, the equations may be altered to take into account fewer components of the power tool. For example, it may be determined that certain portions of the tool have a minimal impact on the balance of the tool for a particular application and, thus, need not be taken into consideration due to their nominal affect. By way of example, a polisher designer may conclude that a desired or sufficient balance may be achieved by simply taking into account the counterweight 38, pad 16 and pad holder 78*a*. Thus, the above equations may be altered to eliminate reference to the bolt 80. The more items or components of the tool that are considered and taken into account, the more accurate the modeling of the tool will be; however, if certain items have a minimal impact or affect on the modeling of the tool, than they may be considered negligible and unnecessary to factor into the analysis.

In a preferred embodiment, the counterweight of the tool is specifically designed to balance the tool 10 both statically and dynamically. For example, the counterweight may be designed in a manner characterized by the following equations:

$$m_{CW}x_{CW}=-(m_{PH}x_{PH}+m_{PAD}x_{PAD}+m_{BO}x_{BO})$$

$$I_{X^{CW}Z^{CW}}=-(I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}+m_{CW}x_{CW}z_{CW})$$

$$I_{Y^{CW}Z^{CW}}=-(I_{Y^{PAD}Z^{PAD}}+I_{Y^{PH}Z^{PH}}+I_{Y^{BO}Z^{BO}})$$

Assuming the y-axis is oriented such that $m_{system}y_{system}=0$ is satisfied, the last equation is approximately equal to zero.

If a more accurate model or balancing of the tool 10 is desired, the equations may be modified as follows:

$$m_{CW}x_{CW}=-(m_{PH}x_{PH}+m_{PAD}x_{PAD}+m_{BO}x_{BO}+m_{BE}x_{BE}+m_{SP}x_{SP}+m_{AD}x_{AD})$$

$$I_{X^{CW}Z^{CW}}=-(I_{X^{PH}Z^{PH}}+m_{PH}x_{PH}z_{PH}+I_{X^{PAD}Z^{PAD}}+m_{PAD}x_{PAD}z_{PAD}+I_{X^{BO}Z^{BO}}+m_{BO}x_{BO}z_{BO}+I_{X^{BE}Z^{BE}}+m_{BE}x_{BE}z_{BE}+I_{X^{SP}Z^{SP}}+m_{SP}x_{SP}z_{SP}+I_{X^{AD}Z^{AD}}+m_{AD}x_{AD}z_{AD}+m_{CW}x_{CW}z_{CW})$$

where subscript items BE, SP and AD denote the pad assembly bearings 40*a–b*, spacer 98, and adhesive 76, respectively. In yet other embodiments, the equation may be amended to include accessories used with the tool 10, such as a bonnet (not shown). As mentioned above, the accuracy of the equation in modeling the tool 10 improves as more components of the tool 10 are accounted for. Thus, the latter equation will provide a more accurate model for the purposes of statically balancing the tool 10; however, the difference between the products of each equation may be so nominal that the former equation is sufficient to reach the desired balance.

In a preferred embodiment, the mass and distance associated with bolt 80 are approximately $3.2687\times10^{-2}$ lbm and −0.33755 in, respectively. The mass and distance associated with the pads 78*b–d* are approximately $2.1164\times10^{-1}$ lbm and −0.33755 in, respectively. The mass and distance associated with the pad holder 78*a* are approximately $3.64386\times10^{-1}$ lbm and −0.33755 in, respectively. Using the above equation, this produces a counterweight with the properties $m_{CW}x_{CW}=0.20547$ lbm·in. and $z_{CW}=0.65$ in. The masses and inertia values calculate out to:

$$I_{X^{CW}Z^{CW}}=-(0.16827\ \text{lbm}\cdot\text{in}^2+0+0.14470545\ \text{lbm}\cdot\text{in}^2+0+0.011584027\ \text{lbm}\cdot\text{in}^2+0+(0.20547)(0.65))$$

or $$I_{X^{CW}Z^{CW}}=-0.191\ \text{lbm}\cdot\text{in}^2$$

Therefore, in this embodiment, the properties of the counterweight must satisfy $m_{CW}x_{CW}=0.20547$ lbm·in and $I_{X^{CW}Z^{CW}}=-0.191$ lbm·in$^2$. For example, if $x_{CW}=0.5778$ in, $m_{CW}$ will equal 0.355607 lbm.

Figure 15:
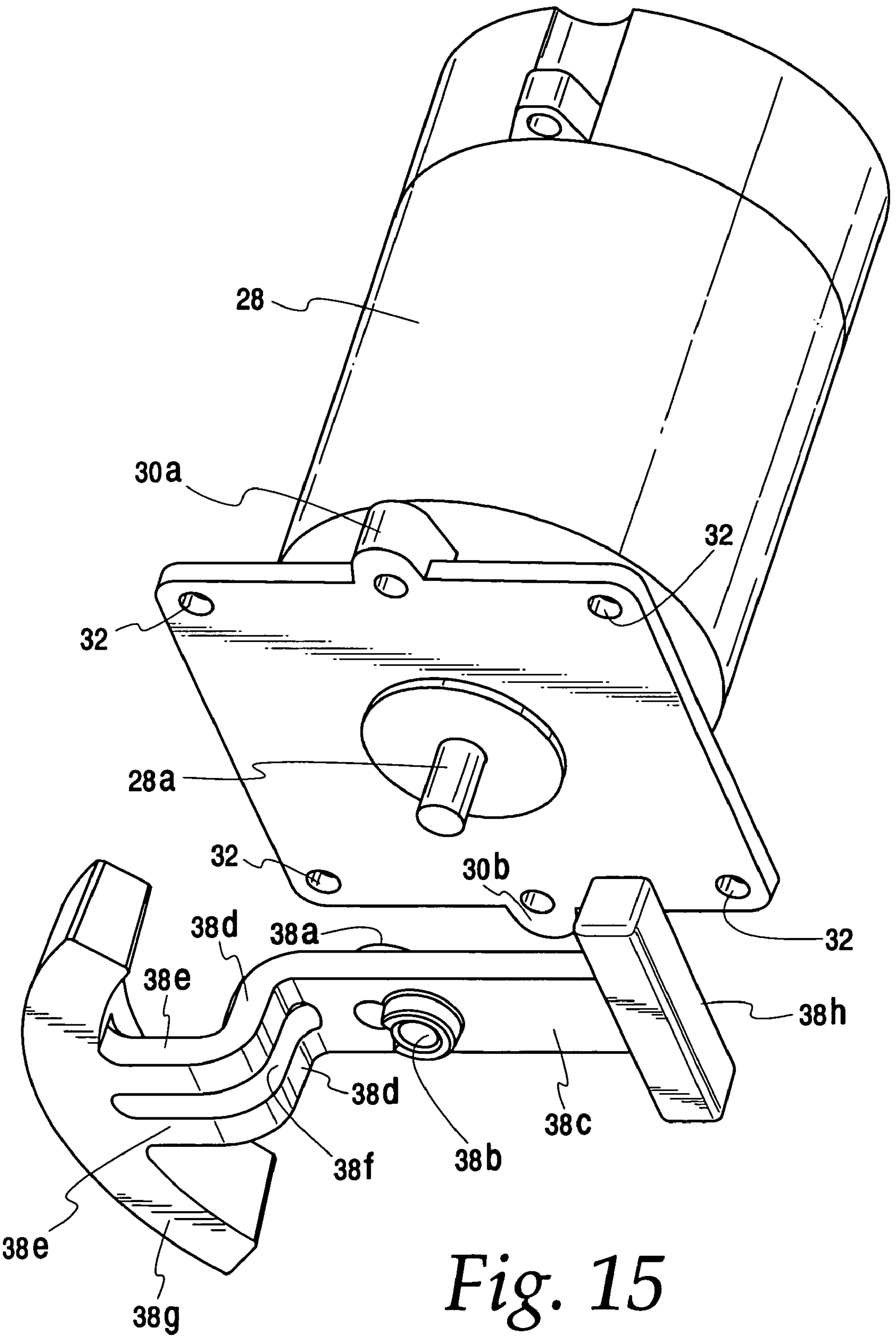
FIG. 15 is an exploded view of the motor and counterweight used with the power tool of FIG. 1.
Figure 16B:
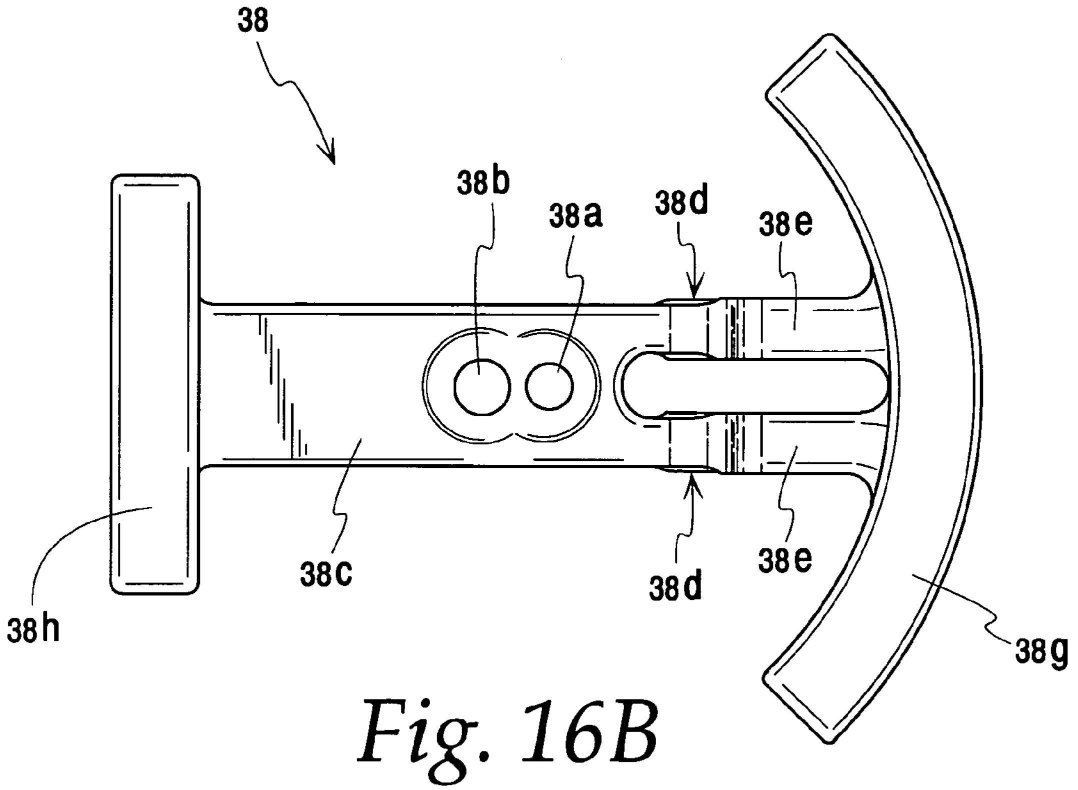
FIGS. 16A–B are side elevational and top plan views, respectively, of the counterwieght of FIG. 15.
Figure 16A:
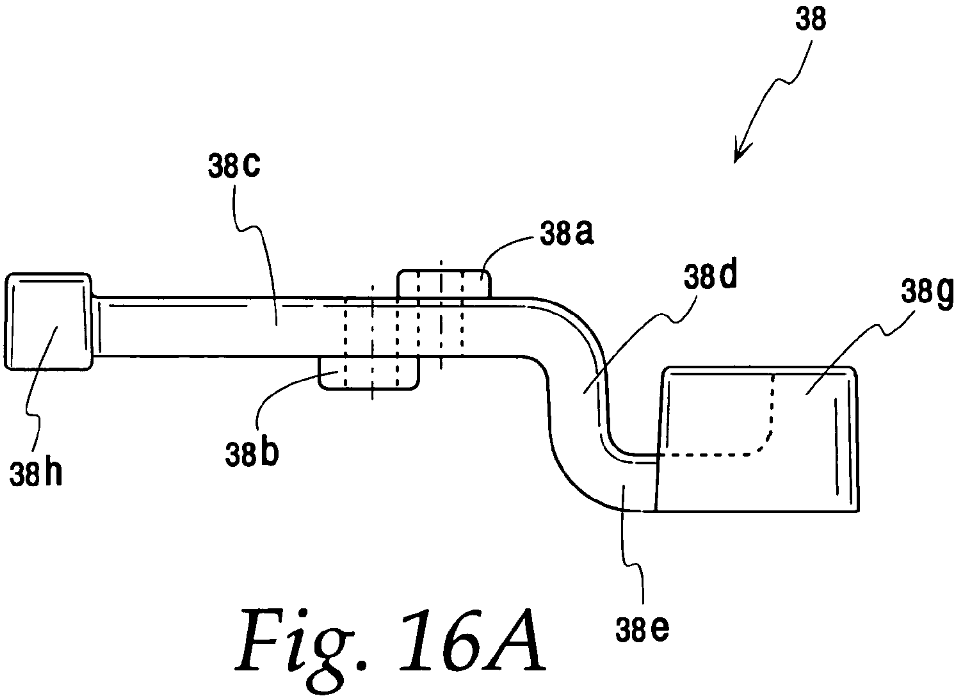
Figure 17:
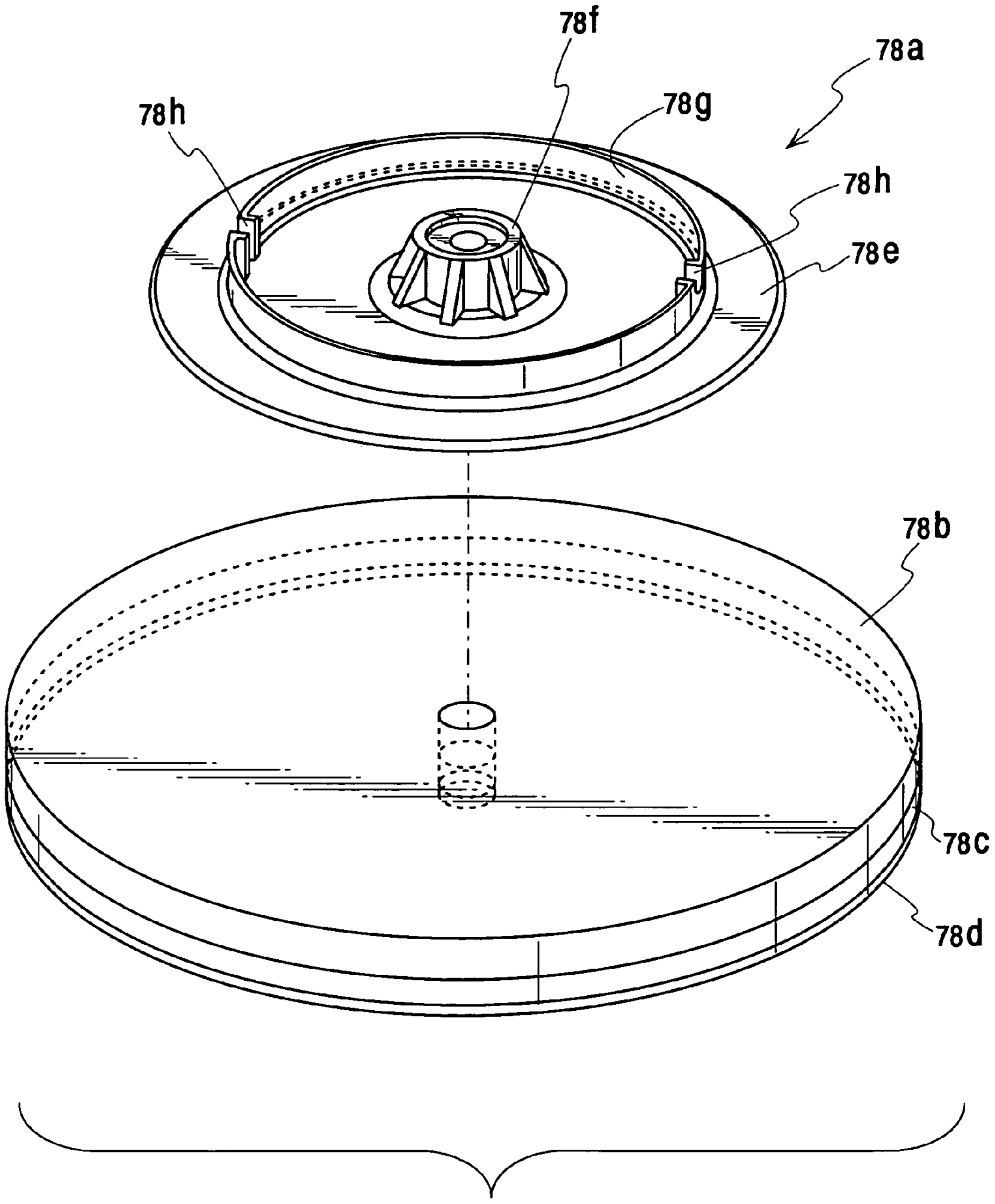
FIG. 17 is an exploded view of a portion of the pad assembly of FIG. 13.
Figure 18:
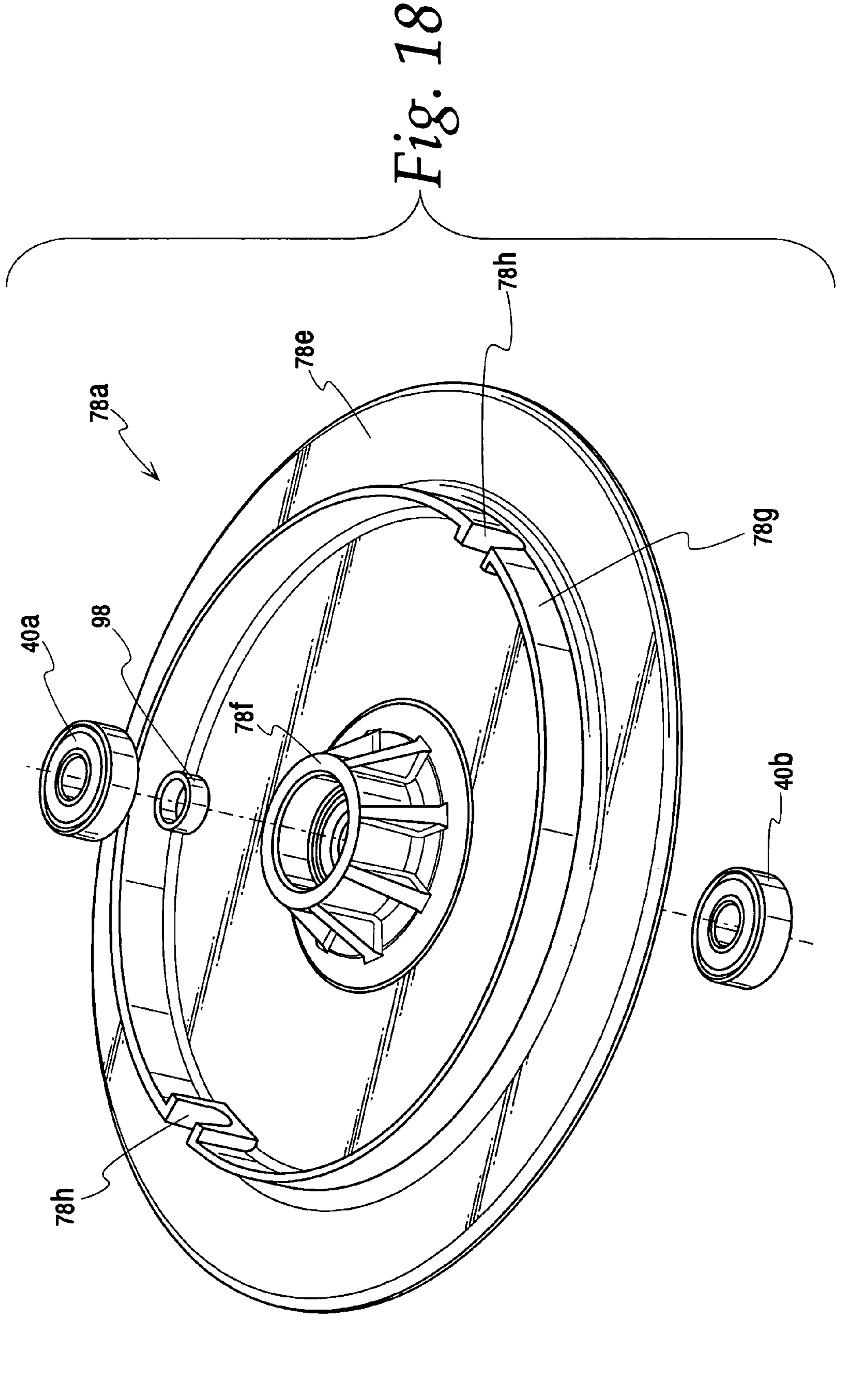
FIG. 18 is an exploded view of a portion of the pad assembly of FIG. 13.

In a preferred embodiment, a counterweight designed to statically and dynamically balance the tool 10, as illustrated in FIGS. 15 and 16A–B, includes a first horizontal portion 38*c*, which defines bores 38*a–b* of the counterweight 38. More particularly, the first horizontal portion 38*c* is generally rectangular in shape and cross-section and has bores 38*a–b* disposed therein between first and second ends of the structure. The first bore 38*a* is internally threaded for receiving the motor output shaft 28*a* and has a sleeve or collar extending upward from the top surface of the horizontal portion 38*c* in order to increase the length of the bore 38*a*. The second bore 38*b* is internally threaded for receiving the bolt 80 connecting the pad assembly 78 to the tool 10 and has a sleeve or collar extending downward from the bottom surface of the horizontal portion 38*c* in order to increase the length of the bore 38*b*. The lengthened bores 38*a* and 38*b* increase the amount of the shaft 28*a* and bolt 80 disposed therein, which subsequently strengthens the mechanical connection made between the counterweight 38 and shaft 28*a* and between counterweight 38 and bolt 80.

A second horizontal portion 38*e* is connected to the first horizontal portion 38*c* via a generally vertical interconnecting portion 38*d*. More particularly, the portion 38*d* interconnects the second horizontal portion 38*e* such that it is generally parallel to the first horizontal portion 38*c*. Collectively, the connecting portion 38*d* and second horizontal portion 38*e* form a generally L shaped structure having a central opening 38*f* that generally divides the connecting portion 38*d* and second horizontal portion 38*e* into two parallel legs which allows for a desired mass to be reached so that the counterweight 38 may statically and dynamically balance the tool, as will be discussed in further detail below.

A first end member 38*g* extends from the second horizontal portion 38*e* on the end opposite the interconnecting portion 38*d*. The first end member 38*g* is arcuately shaped about the end of the second horizontal portion 38*e*, with the end of the second horizontal portion 38*e* being connected to the inner curved surface of the end member 38*g* and the end member 38*g* having a generally rectangular cross section at any given point there along. The radius of curvature of the end portion 38*g* preferably corresponds to that of the annular wall 78*g* of pad support 78*a* so that the end member 38*g* can rotate within the annular wall 78*g* without interference by the wall 78*g*.

A second end member 38*h* is connected to the first horizontal portion 38*c* on the side opposite the interconnecting member 38*d*. Thus, the first and second end members 38*g* and 38*h* are located on opposite sides of the counterweight 38. The second end member 38*h* is generally rectangular in shape and is generally centered off of the end of the first horizontal portion 38*c*. This configuration allows the counterweight 38 to be made out of less material, but yet supply a sufficient amount of revolutions per minute (RPMs) to rotate the pad assembly 78 as desired.

Figure 19:
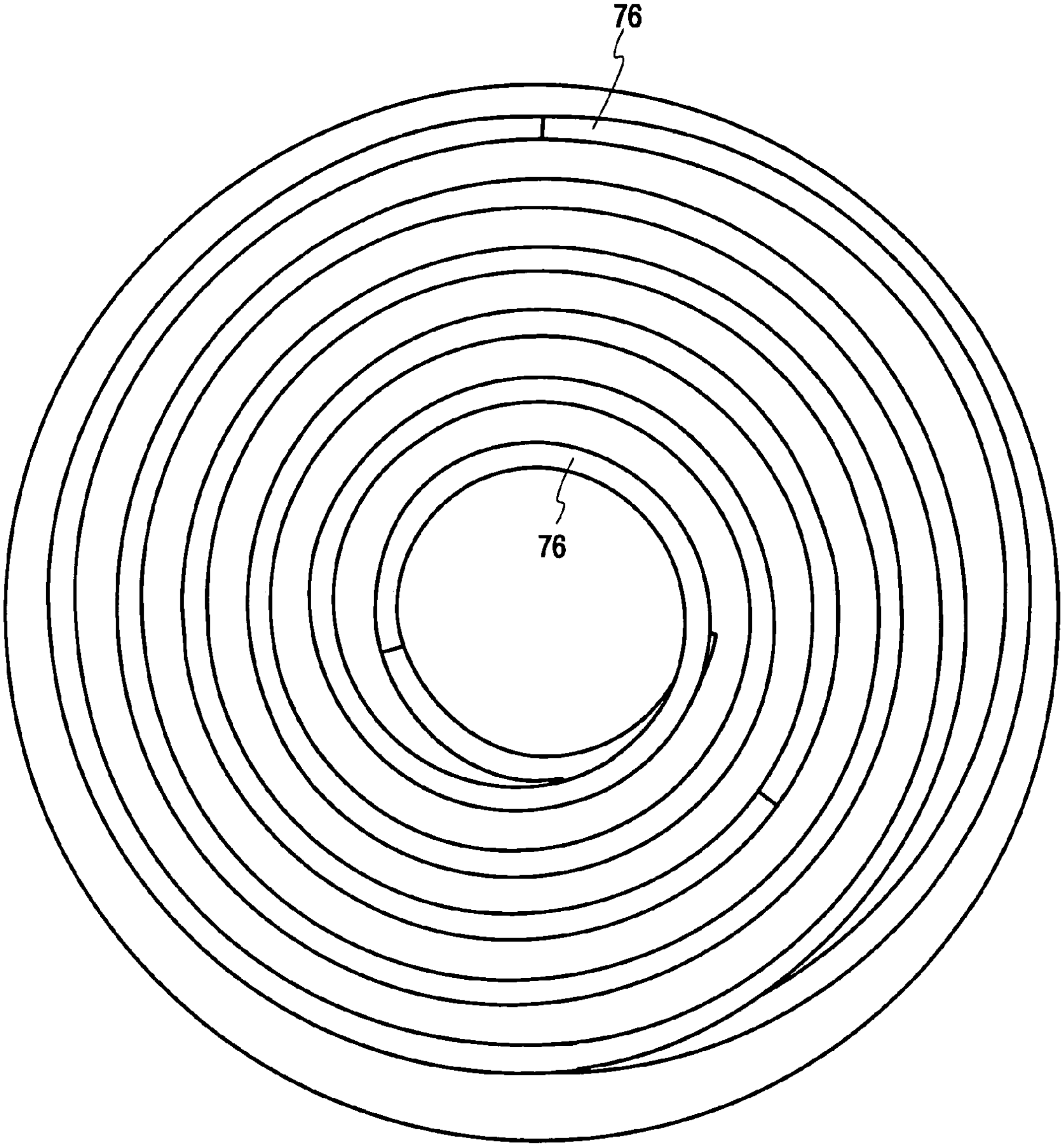
FIG. 19 is a plan view of a pad illustrating a spiral footprint with which an adhesive may be applied to the pad in accordance with the invention.

It should be understood that the above equations (or variations thereof) may be used to design a variety of components in order to statically and dynamically balance the tool. For example, the equations (or variations thereof) may be used to determine a variety of masses and centers of gravity for each component of the tool 10 in order to statically and dynamically balance the tool 10. In addition, the layout and configuration of the components of tool 10 may also be altered or specifically selected in order to achieve dynamic balance. For example, the spiral configuration of the adhesive 76 illustrated in FIG. 19 is designed to provide a mass and center of gravity which assists the tool in being balanced.

It should also be understood that the more components and features of the tool that are taken into account, the more accurate the equation's modeling of the tool 10 will be. The more accurate the modeling (e.g., accounting for adhesive 76, bearings, accessories such as bonnets, etc.) the better balanced the tool 10 will become. For example, the tool 10 may also include a fan to cool the motor and tool components, such as the one shown in broken line in FIG. 20. If such is the case, the above equations may be altered to include the fan. For example, the motion equations may read as follows:

$$m_{system}x_{system}=m_{BO}x_{BO}+m_{CW}x_{CW}+m_{PAD}x_{PAD}+m_{PH}x_{PH}+m_f x_f=0$$

$$m_{system}y_{system}=m_{BO}y_{BO}+m_{CW}y_{CW}+m_{PAD}y_{PAD}+m_{PH}y_{PH}+m_f y_f=0$$

$$I_{X_O Z_O}=I_{X^{CW}Z^{CW}}+m_{CW}x_{CW}z_{CW}+I_{X_f Z_f}+m_f y_f(z_2+z_3)+m_{PAD}x_{PAD}z_{PAD}+m_{PH}x_{PH}z_{PH}+m_{BO}x_{BO}z_{BO}=0$$

$$I_{Y_O Z_O}=I_{Y^{CW}Z^{CW}}+m_{CW}y_{CW}z_{CW}+I_{Y_f Z_f}+m_f y_f(z_2+z_3)+m_{PAD}y_{PAD}z_{PAD}+m_{PH}y_{PH}z_{PH}+m_{BO}y_{BO}z_{BO}=0$$

where subscript item f denotes the fan properties. As before, we assume there are no y-components of center of gravity for any component, therefore $m_{system}y_{system}=0$. In addition, since the x-z plane and y-z plane are planes of symmetry the products of inertia $I_{xz}=I_{yz}=I_{xy}=0$. Also, since the motor is rotationally balanced $x_m=y_m=0$. Furthermore, $I_{X^{PAD}Z^{PAD}}$, $I_{X^{PH}Z^{PH}}$, and $I_{X^{BE}Z^{BE}}$, and $I_{Y^{PAD}Z^{PAD}}$, $I_{Y^{PH}Z^{PH}}$, and $I_{Y^{BE}Z^{BE}}$ are equal to zero). Thus, the properties of fan f can be included in the equation to more accurately model the tool 10.

Although specific equations have been provided, it should be understood that such equations are provide as a preferred method for characterizing the power tool and its components, and are not meant to be deemed the sole way in which the power tool 10 can be statically and dynamically balanced. Thus, it should be understood that such balance can be achieved by a variety of equations and methods which are intended to be covered by the scope of this application. Once statically and dynamically balanced, the tool 10 will feel more balanced at rest and in operation and will be less affected by the rotation of the counterweight 38, the pad assembly 78 and other associated components.

Figure 21A:
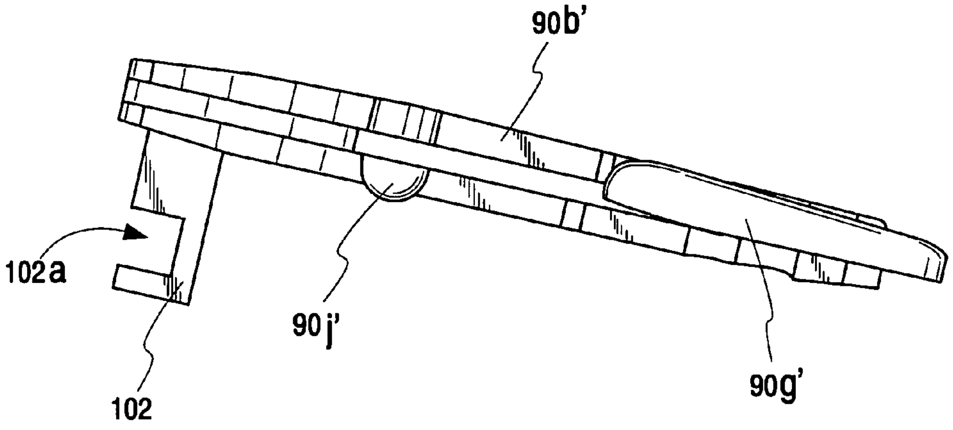
FIG. 21A is a side elevational view of an alternate embodiment of an actuator lever in accordance with the present invention.
Figure 21B:
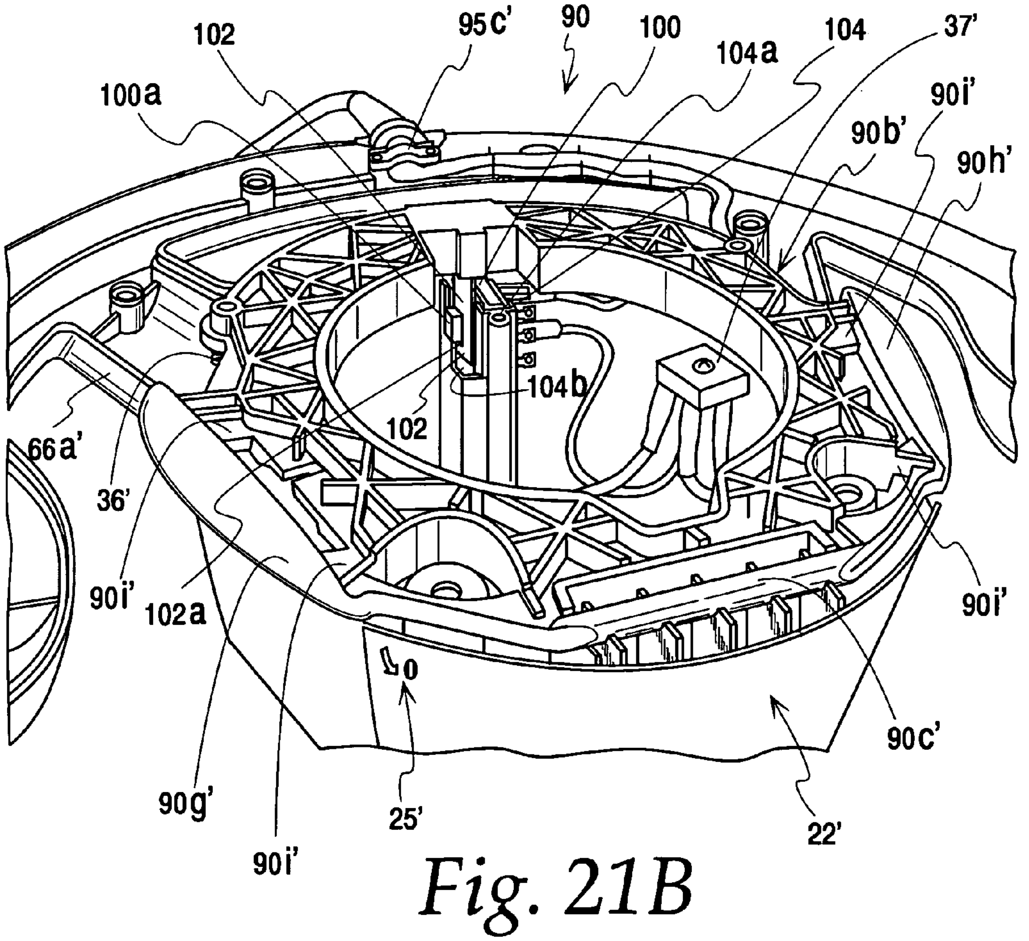
FIG. 21B is a partial perspective view of an alternate embodiment of a power tool using the alternate lever of FIG. 21A.

Turning now to FIGS. 21A–B, there is illustrated an alternate embodiment of tool 10 embodying features in accordance with the present invention. In this embodiment, the actuator 90 includes a slide switch rather than a push-button switch. For convenience, features of alternate embodiments illustrated in FIGS. 21A–24B that correspond to features already discussed with respect to the embodiment of FIGS. 1–19 are identified using the same reference numeral in combination with an apostrophe (') merely to distinguish one embodiment from the other, but otherwise such features are similar.

More specifically, the actuator 90 in FIGS. 21A–B includes a slide switch 100 having an actuating member, such as tab 100*a*, extending out from a side of the switch 100 which is capable of being moved in a linear direction, generally from one end of the switch 100 to the other. Like switch 90*a* discussed above, switch 100 regulates power to the motor 28' and is movable between an active position to allow power to the motor 28' and a de-active position to generally prohibit power (or operable power) to the motor 28'. The switch 100 is nested in a socket 104 and is secured in position via a fastener, such as a screw thread into bore 104*a*. The actuating lever 90*b*' is generally ring shaped and movable to operate the switch 100 between the active and de-active positions, as discussed above; however, the lever 90*b*' has a protruding member such as arm 102 extending downward from the bottom surface of lever 90*b*' near where the switch engaging surface 90*d* was located in the embodiment discussed above. The arm 102 has a general rectangular sheet-like shape and has a notch 102*a* cut away from a side of the arm 102. The notch 102*a* corresponds in shape to the tab 100*a* so that the tab 100*a* may be disposed, at least in part, in the notch 102*a*. Thus, when the operator presses one (or both) of the paddle extensions 90*g*' and 90*h*', the lever 90*b*' slides the tab 100*a* of switch 100 down into its "on" position thereby compressing springs 36'.

In a preferred embodiment, the distal end of the tab 100*a* passes through a slot-like portion 104*b* of the socket 104 so that the tab 100*a* may be fully placed into its "on" position. The switch 100 provides a sufficient amount of friction to maintain the springs 36' in their compressed position so that the actuator 90 remains in its "on" state until the operator lifts one (or both) of the paddle portions 90*g*' and 90*h*' to return the lever 90*b*' to its spring biased "off" state. With such a configuration, the actuator 100 and springs 36' may also serve as an automatic shutoff or de-activation mechanism in that the springs 36' will force the switch 100 into its "off" position (wherein the post 100*a* is shifted up into its "off" position) when an impact of a magnitude great enough to overcome the friction holding the switch 100 in its "on" position is experienced by the tool. For example, if the tool 10 is accidentally dropped, the tool 10 maybe configured to react to the unintentional impact by automatically switching the switch 100 into its "off" position, thereby ceasing operation of the tool 10. Preferably the tool 10 will be setup to switch "off" when an impact of a predetermined magnitude (e.g., a threshold magnitude) is applied to one or more of the front, rear, side portions, top, bottom and handle of the power tool 10.

By way of example and not limitation, the tool 10 may be configured so that a force ranging between 0.2 lb–3 lb and higher will cause the actuator 90 to turn off. In a preferred embodiment, a force of approximately 1 lb is required to return the actuator 90 to its "off" state, which is of a high enough threshold to prevent shutoff due to very minor impacts and of a low enough threshold to cause shutoff due to dropping of the tool 10, such as a drop of three feet or more. The force required to deactivate the tool can be adjusted by selecting switches with more or less frictional resistance, and/or by increasing or decreasing the strength of the springs 36' used in the tool 10. For example, the switch 100 may be selected such that it only requires a force of approximately 0.25 lb to return tab 100*a* to its "off" state.

Figure 22A:
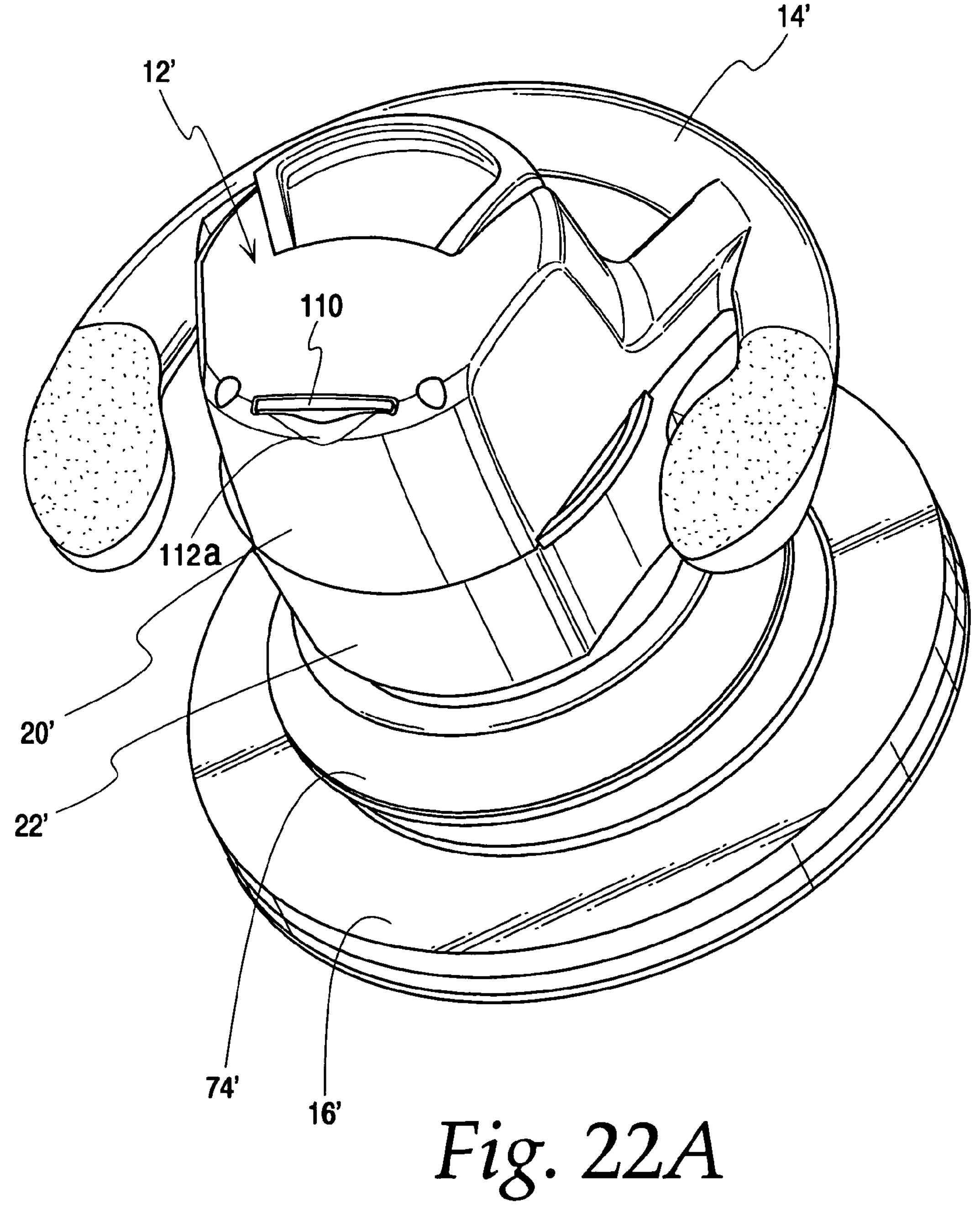
FIGS. 22A–B are perspective and exploded views, respectively, of an alternate power tool embodying features of the present invention.
Figure 22B:
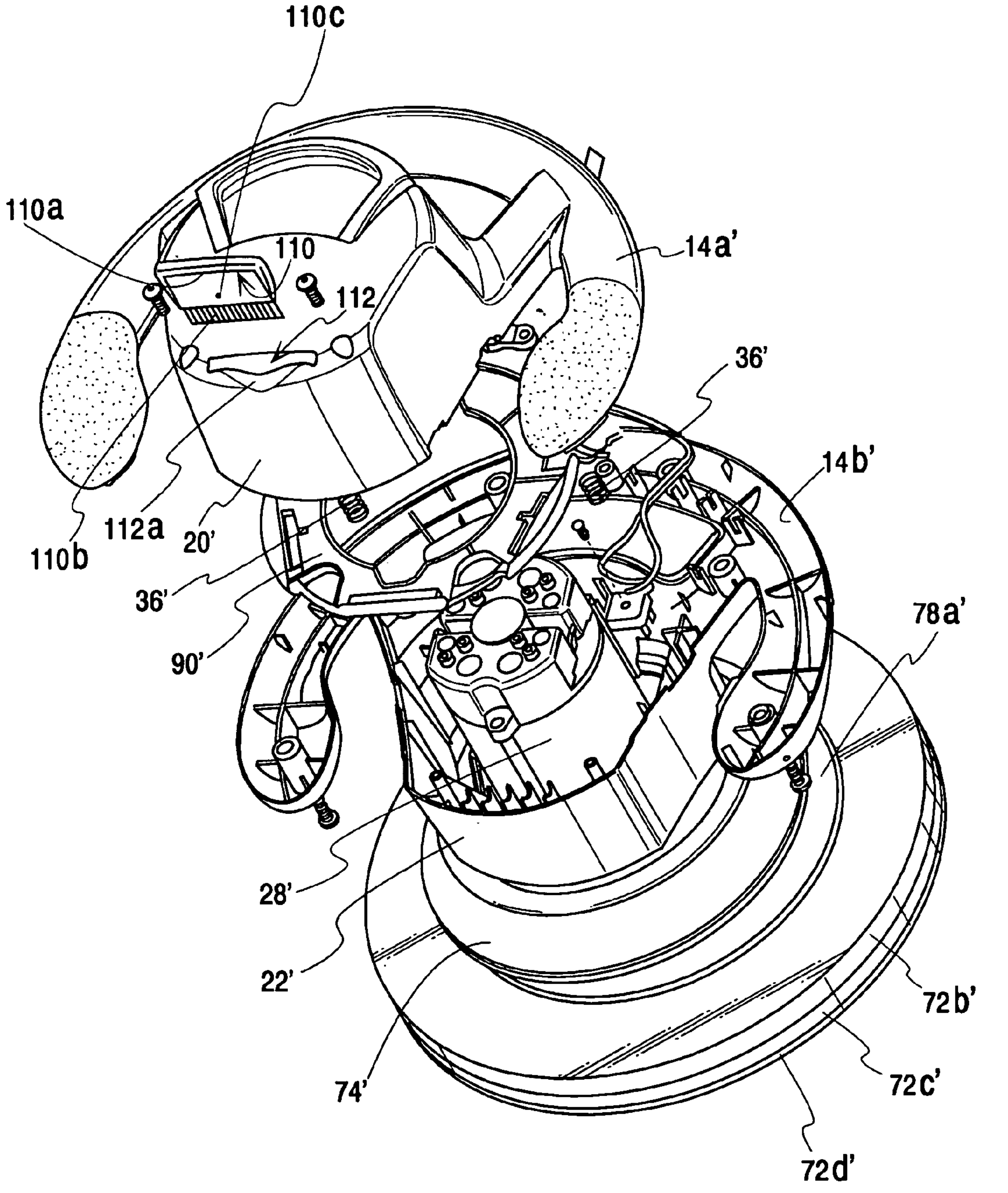

Turning now to FIGS. 22A–B, there is illustrated another alternate embodiment of tool 10 embodying features in accordance with the present invention. In this embodiment, the tool 10 includes an accessory 110, which can be stored on the tool 10 and used in conjunction therewith. More particularly, the tool 10 in FIGS. 22A–B includes a recess, such as slot 112 defined by housing 12, for receiving and maintaining an accessory, such as the brush like tool 110 illustrated therein. The slot 112 is preferably rectangular in shape and is deep enough to allow at least a majority of the brush 110 to be inserted therein. In the embodiment illustrated, the slot 112 is deep enough to allow the brush 110 to be fully inserted therein so that the top of the brush 110 is flush with, or recessed below, the upper housing surface 20*e*' of tool 10. The slot 112 may also include a recessed groove portion 112*a* which provides access to a portion of the brush 110 so that the operator may more easily remove the brush 110 from slot 112.

The brush 110 is preferably of a shape that corresponds to the slot 112 and includes a grippable feature such as ridge 110*a* along its upper portion to assist the operator in removing the brush 110 from slot 112. Extending out from the lower portion of the brush 110 are bristles 110*b* which may be used to sweep up or away residual particles of the workpiece or materials used on the workpiece, such as dry wax. The brush 110 may also be provided with a releasable locking mechanism, such as a detent or such as stud 110*c*, which may secure the brush 110 into slot 112 by mating with a stud receiving surface or groove located on an inner surface of the slot 112 (not shown). With such a configuration, the accessory may be moved between a locked location on the tool 10 and an unlocked position remote from the tool 10 so that the accessory may be used in conjunction therewith.

Figure 23A:
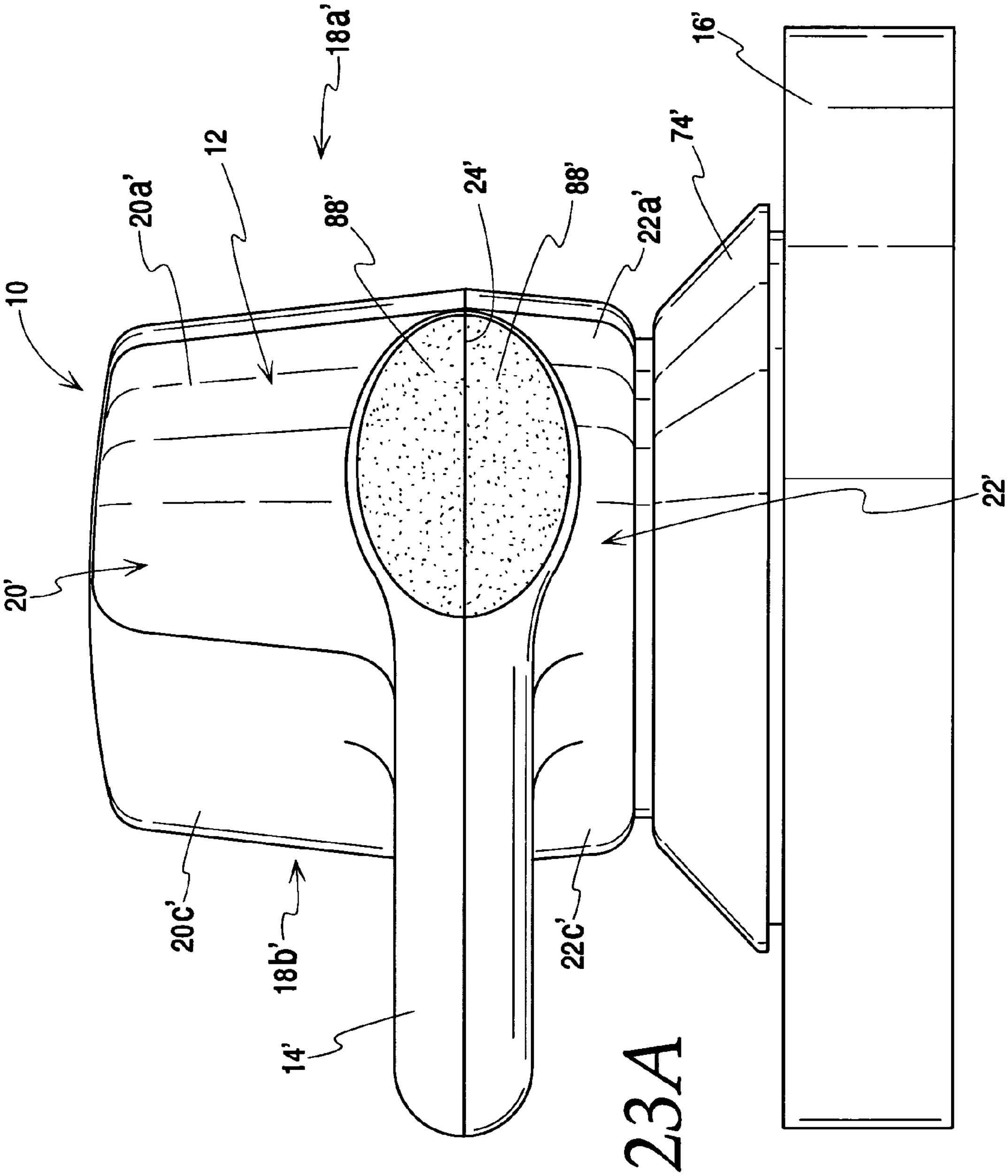
FIGS. 23A–B are side elevational and top plan views, respectively, of an alternate power tool embodying features of the present invention.
Figure 23B:
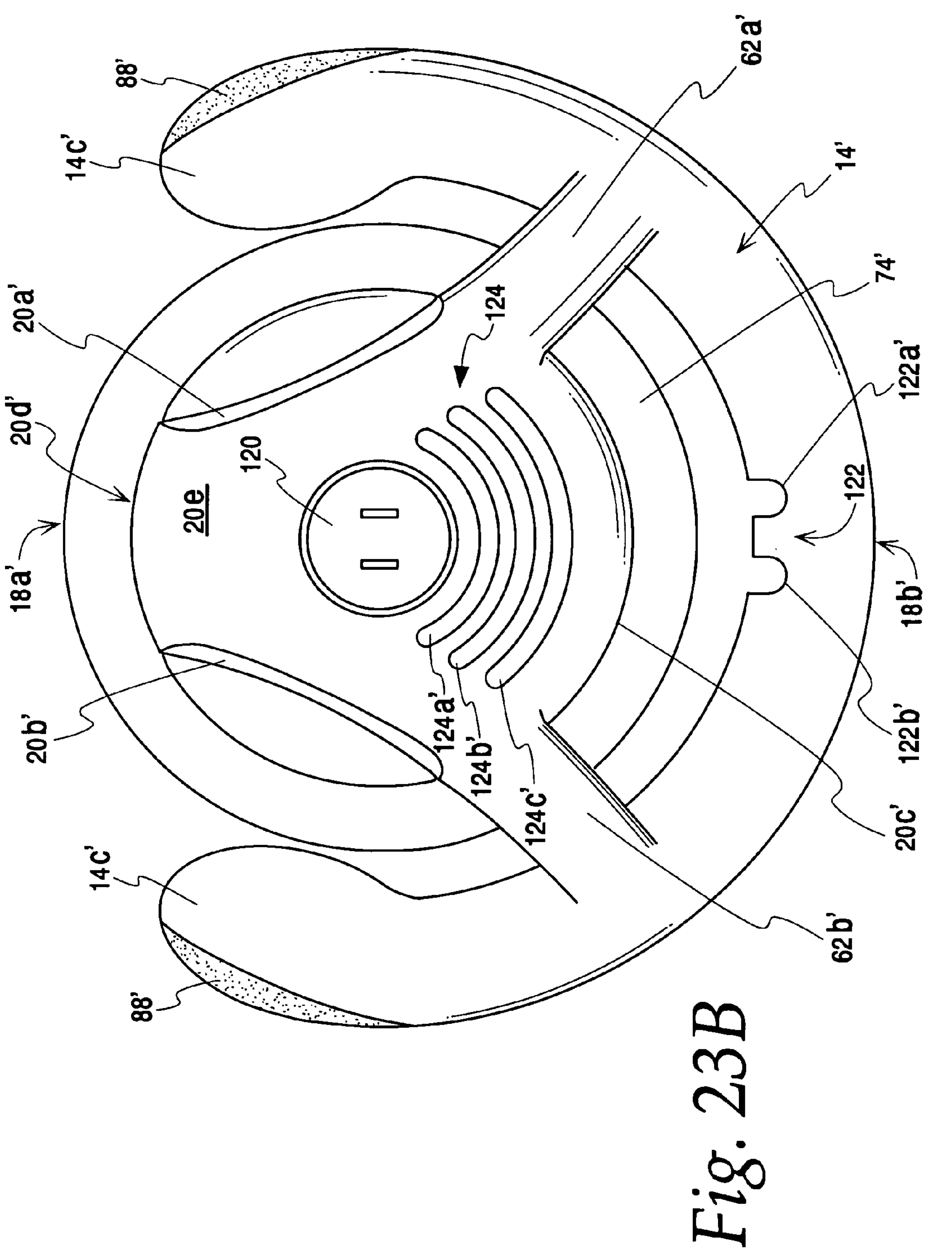

Turning now to FIGS. 23A–B, there is illustrated another embodiment of tool 10 embodying features in accordance with the present invention. In this embodiment, the tool 10 includes an alternate electrical connector, strain relief and grip configuration. More particularly, the tool 10 includes a recessed male electrical connector 120 positioned in the top surface 20*e*' of upper housing portion 20', and to which a power or extension cord (not shown) may be electrically connected to supply power to the tool 10. In yet other embodiments, alternate electrical connectors, such as a female connector, may be used in order to connect to different types of connectors and power cords, such as a DC power cord.

In addition to the alternate electrical connector, tool 10 in FIGS. 23B–A may be provided with a strain relief or cord lock 122 for preventing the power cord from unintentionally disconnecting from the connector 120. More particularly, the rear portion of handle 14' may be configured with two notches 122*a*–*b* for receiving at least a portion of the power cord as it is wrapped around handle 14' and connected to the electrical connector 120. Preferably the notches 122*a*–*b* are of a width slightly smaller than the diameter of the power cord so that the power cord may be press fit into the notches, thereby providing an added amount of friction and strain relief to prevent the power cord from inadvertently being disconnected from the electrical connector 120.

The tool 10 illustrated in FIGS. 23A–B also includes an alternate vent or passage configuration in the top surface 20*e*' of the tool 10. More particularly, vent 124 is comprised of three arcuately shaped openings 124*a*–*c* which are stacked in a concentric manner with the shared axis for the curved openings being positioned about the center of the electrical connector 120. Preferably the openings 124*a*–*c* have a curved shape corresponding to the curvature of the connector 120 and are structured such that opening 124*b* is larger than opening 124*a* and opening 124*c* is larger than 124*b*. Given that the tool 10 is symmetrical about a vertical reference plane extending centrally from the front of the unit 18*a*' to the rear of the unit 18*b*', the other side of the tool is a mirror image of the side illustrated in FIG. 23A.

In addition to the alternate features discussed above, the tool 10 of FIGS. 23B–A also includes an alternative gripping surface 88'. More particularly, the gripping surfaces 88' illustrated comprise an oval shaped grip positioned about the outer side surface of the enlarged handle ends 14*c*'. Preferably, the operator will grip the ends 14*c*' of the handle 14' with his or her palm covering the grip 88' on the outer side surface of the handle ends 14*c*' and his or her fingers and thumb wrapping around the lower and upper surfaces of the handle 14' respectively. The ends 14*c*' illustrated in this embodiment provide advantages similar to those discussed above with respect to ends 14*c*, such as, for example, providing the operator with a grip having increased surface area thereby allowing the operator to use more of his or her hand to grip the tool and to maintain a stronger grip thereon.

Figure 24A:
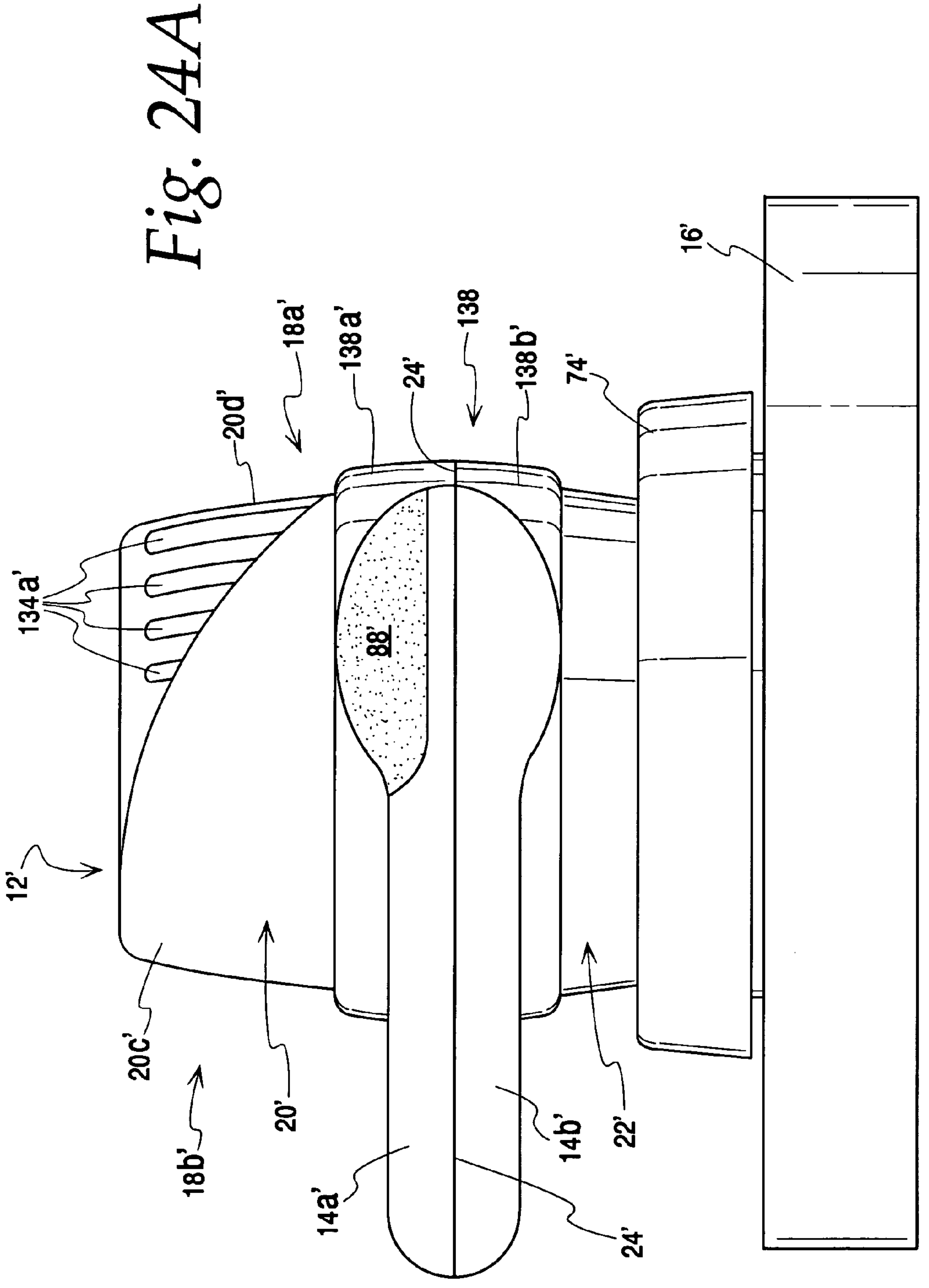
FIGS. 24A–B are side elevational and top plan views, respectively, of an alternate power tool embodying features of the present invention.
Figure 24B:
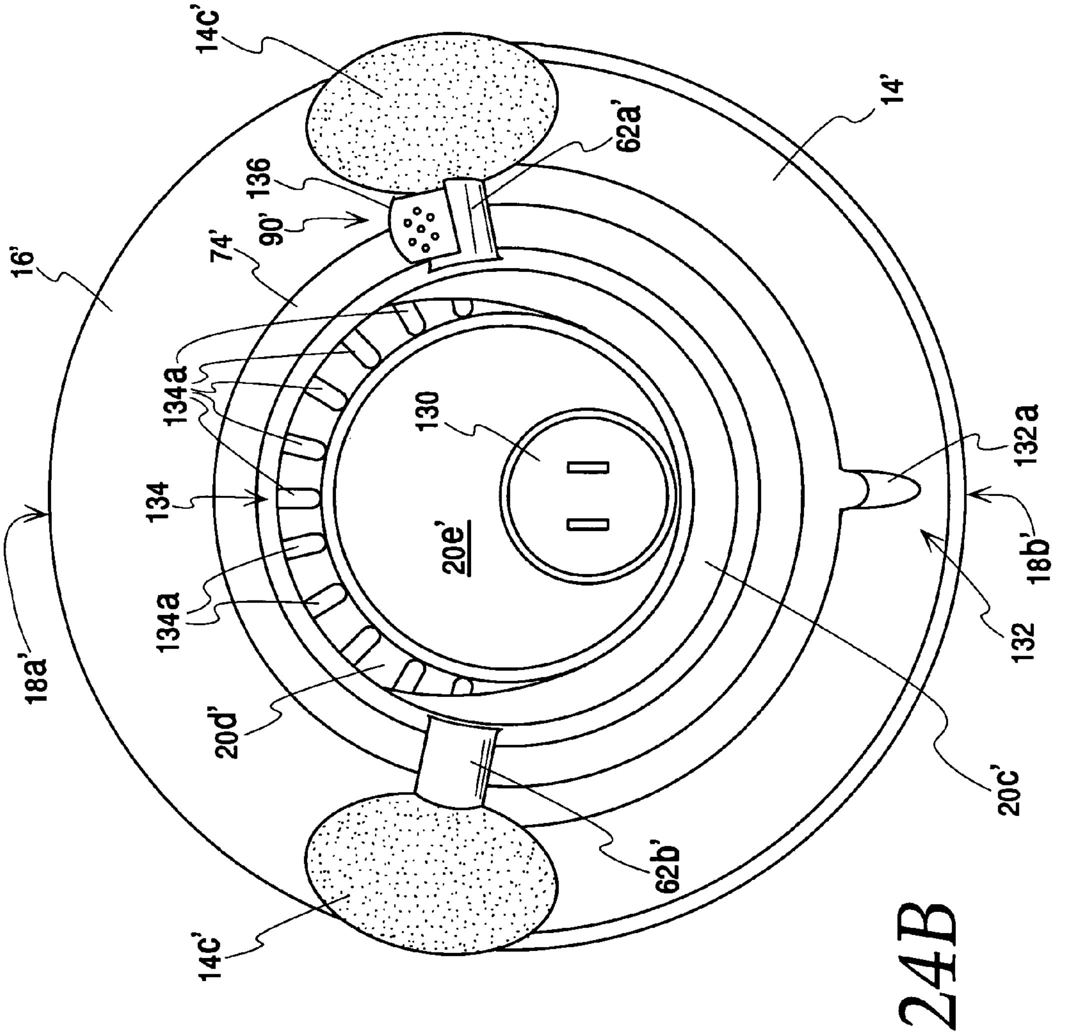

Turning now to FIGS. 24A–B, there is illustrated another embodiment of tool 10 embodying features in accordance with the present invention. In this embodiment, the tool 10 includes an alternate electrical connector, cord lock, vent passage, and actuator configuration, and a slightly modified housing and handle end configurations. More particularly, the tool 10 includes a recessed male electrical connector 130 similar to the connector 120 discussed above. The connector 130 is positioned in the top surface 20*e*' of upper housing portion 20' such that a power cord (not shown) may be electrically connected thereto to supply power to the tool 10.

The tool 10 of FIGS. 24A–B also includes a strain relief or cord lock 132 for preventing the power cord from unintentionally disconnecting from the connector 130. More particularly, the rear portion of handle 14' may be configured with a notch 132*a* for receiving at least a portion of the power cord as it is wrapped around handle 14' and connected to the electrical connector 130. Like the cord lock 122 discussed above, the notch 132*a* is preferably of a width slightly smaller than the diameter of the power cord so that the power cord may be friction fit into the notch to assist in preventing the power cord from accidentally being disconnected from the tool 10.

As illustrated in FIGS. 24A–B, the tool 10 also includes an alternate vent configuration 134 in the front 20*d*' of the tool 10. More particularly, vent 124 is comprised of a plurality of vertical openings 134*a* which are circumferentially spaced about the front 20*d*' of housing 12'. Preferably, the openings 134*a* become smaller towards the rear 18*b*' of the unit 10, proceeding up towards the upper surface 20*e*' along a line formed by rear wall 20*c*'.

The tool 10 of FIGS. 24A–B also includes an alternate actuator 90' comprising a switch 136 located adjacent the enlarged handle end 14*c*' located on the right side of the tool 10. The switch 136 is generally rectangular in shape and is positioned proximate to spoke member 62*a*'. The switch 136 operates similar to the pushbutton switch 90*a* discussed above with respect to FIGS. 1–19. Thus, the operator may activate and de-activate the tool 10 while maintaining an effective two-handed grip over the tool 10 by simply pressing switch 136 between its "on" and "off" states. With the exception of the switch 136, the tool 10 in FIGS. 24A–B is symmetrical about a vertical reference plane extending centrally from the front of the unit 18*a*' to the rear of the unit 18*b*' through the center. Thus, the other side of the tool is generally a mirror image of the side illustrated in FIG. 24A. In alternate embodiments, the tool of FIGS. 24A–B may have a switch similar to 136 located off each handle end 14*c*' so that the apparatus is perfectly symmetrical and may be shut off using either hand or from either side of the tool 10 (as is the case with the embodiment of FIGS. 1–19).

In addition to the alternate features discussed above, the tool 10 of FIGS. 24A–B also includes minor changes in the housing 12' and handle ends 14*c*'. For example, rather than having tapered portions about the sides of the housing 12', the tool 10 has an arcuate housing configuration with a sloped and arcuate rear wall 20*c*' and an arcuate front wall 20*d*'. In addition, housing 12' includes a stepped middle portion 138, which is divided into upper and lower stepped portions 138*a*–*b* by parting line 24'. The spoke members 62*a*'–*b*' extend outward from the belt-like stepped portion 138, and are connected to handle ends 14*c*'.

The handle ends 14*c*' of FIGS. 24A–B are slightly different than handle ends 14*c* in that they have a more bulbous or ball-shaped configuration. A grip portion 88' is located on the top surface of handle ends 14*c*', such that an operator may position his or her palm on the grip 88' and wrap his or her fingers around the sides of handle ends 14*c*'. Although more bulbous than the handle ends discussed above, the alternate handle ends 14*c*' in FIGS. 24A–B provide similar advantages to the earlier discussed handle ends 14*c*.

Thus, it is apparent that there has been provided, in accordance with the invention, a power tool having components and features that fully satisfy the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and scope of the appended claims. Applicant also intends this application to cover all methods of manufacturing the apparatus disclosed herein, including, but not limited to, the methods for dynamically balancing a power tool.

What is claimed is:

1. A power tool for working on a workpiece comprising:

a housing having generally a front, rear and a pair of opposing side portions and a top and bottom, the housing defining a generally slot shaped recess for receiving and maintaining a brush type accessory tool that can be used to assist the power tool in working on a workpiece, the brush type tool being movable between the recess and a position remote from the recess to be used to assist the power tool in working on the workpiece;

a motor located in the housing;

a work element to be driven by the motor adjacent to the bottom of the housing for working on a workpiece;

a handle being connected to the housing in at least one position, the handle having first and second end portions spaced apart from the housing and extending about the rear portion of the housing so that the first end portion is positioned at least in part at one of the side portions and the second end portion is positioned at least in part at the other of the side portions; and wherein the handle allows an operator a range of locations about the housing to facilitate desired control over the power tool.

2. A power tool according to claim 1 wherein the first and second end portions of the handle are enlarged with respect to the remainder of the handle.

3. A power tool according to claim 2 wherein the first and second end portions include an enhanced surface over at least a portion thereof to facilitate enhanced gripping for control of the power tool.

4. A power tool according to claim 3 wherein the enhanced surface comprises an outer elastomer surface to facilitate enhanced gripping for control of the power tool.

5. A power tool according to claim 4 wherein the outer elastomer surface comprises an elastomer injected overmolding at the first and second end portions of the handle.

6. A power tool according to claim 1 further comprising a switch electrically connected to the motor to transition the power tool between an active state for working on a workpiece and a de-active state, the switch being operable while a two-handed grip is maintained on the handle of the power tool.

7. A power tool according to claim 6 wherein the switch includes a lever portion extending from the housing near at least one of the first and second end portions such that the switch can be operated through the lever portion while a two-handed grip is maintained on the handle of the power tool.

8. A power tool according to claim 7 wherein the lever portion is elongated to provide a range of locations along the handle from which the switch can be operated while a two-handed grip is maintained on the handle of the power tool.

9. A power tool according to claim 8 wherein the lever portion extends from the housing near both the first and second end portions such that the switch can be operated from either end portion while a two-handed grip is maintained on the handle of the power tool.

10. A power tool according to claim 9 wherein the lever portion includes a generally circular ring portion.

11. A power tool according to claim 6 wherein the switch is automatically shifted to deactivate the power tool when an unintentional impact above a predetermined magnitude is experienced by the power tool.

12. A power tool according to claim 11 wherein the switch is automatically shifted to deactivate the power tool when an unintentional impact above a predetermined magnitude is applied to one or more of the front, rear and side wall portions, the top and the handle of the power tool.

13. A power tool according to claim 12 further comprising a spring to automatically shift the switch to deactivate the power tool when an unintentional impact above a predetermined magnitude is applied to one or more of the front, rear and side portions, the top and bottom portions, and the handle of the power tool.

14. A power tool according to claim 13 wherein the spring biases the lever portion of the switch.

15. A power tool according to claim 14 wherein at least two springs bias the lever portion of the switch.

16. A power tool according to claim 15 wherein the springs are coil springs.

17. A power tool according to claim 1 further comprising a polisher pad operable by the motor for working on a workpiece and a counterweight intermediate the polisher pad and the motor to move the polisher pad in a generally orbital path, the counterweight being generally dynamically balanced to reduce vibrations generated by the power tool.

18. A power tool for working on a workpiece comprising:

a housing defining a recess for receiving and maintaining a brush type accessory tool;

a motor positioned in the housing;

a work element to be driven by the motor below the housing;

a handle being connected to the housing in at least one position, the handle having first and second ends with an elongated portion extending therebetween, the handle ends and elongated portion defining a length of the handle and the handle being generally uniformly spaced apart from the housing throughout at least a majority of the handle length; and a brush type accessory tool to be used to assist the power tool in performing work on a workpiece, the brush type accessory tool being movable between a first position where the accessory tool is stored in the housing recess and a second position remote from the power tool housing to perform work on the workpiece.

19. A power tool according to claim 18 wherein the housing has front and rear portions and the handle extends about the rear portion of the housing.

20. A power tool according to claim 18 wherein the handle extends in at least an one hundred eighty degree arc about the housing.

21. A power tool according to claim 18 wherein the first and second end portions include an enhanced surface over at least a portion thereof to facilitate enhanced gripping for control of the power tool.

22. A power tool according to claim 21 wherein the enhanced surface comprises an elastomer injected overmolding applied to the first and second ends of the handle.

23. A power tool according to claim 18 further comprising a switch electrically connected to the motor to transition the power tool between an activated state for working on a workpiece and a deactivated state, the switch being operable while a two-handed grip is maintained on the handle of the power tool.

24. A power tool according to claim 23 wherein the switch forms a circular ring shaped body defining an aperture through which at least a portion of the motor is disposed, the switch further including first and second operators extending from the body and through the housing with the first operator being located near the first end of the handle and the second operator being located near the second end of the handle so that the switch may be operated from either handle end.

25. A power tool according to claim 18 further comprising a switch electrically connected to the motor to transition the power tool between an activated state for working on a workpiece and a deactivated state, wherein the switch is automatically shifted to deactivate the power tool when an unintentional impact above a predetermined magnitude is applied to the power tool.

26. A power tool according to claim 25 wherein the power tool includes a biasing mechanism to automatically shift the switch to deactivate the power tool when the impact is applied to the power tool.

27. A polisher according to claim 18 further comprising a switch electrically connected to the motor to transition the polisher between an activated state for working on a workpiece and a deactivated state, wherein the switch is automatically shifted to deactivate the polisher when an unintentional impact above a predetermined magnitude is applied to the polisher.

28. A polisher according to claim 27 wherein the polisher includes a biasing mechanism to automatically shift the switch to deactivate the polisher when the impact is applied to the polisher.

29. A power polisher for polishing a workpiece comprising:

a housing defining a recess for receiving and maintaining an accessory tool;

a motor positioned in the housing;

a pad driven by the motor below the housing;

a handle being connected to the housing in at least one position, the handle having first and second free ends forming substantially large gripping portions for maintaining control of the polisher; and a brush type accessory tool to be used to assist the polisher in performing work on a workpiece, the brush type accessory tool being movable between a first position wherein the accessory tool is stored in the recess and a second position remote from the polisher housing to perform work on the workpiece.

30. A polisher according to claim 29 wherein the housing has front and rear portions and the handle extends about the rear portion of the housing.

31. A polisher according to claim 29 wherein the handle extends in at least an one hundred eighty degree arc about the housing.

32. A polisher according to claim 29 wherein the first and second end portions include an enhanced surface over at least a portion thereof to facilitate enhanced gripping for control of the polisher.

33. A polisher according to claim 32 wherein the enhanced surface comprises an elastomer injected overmolding applied to the first and second ends of the handle.

34. A polisher according to claim 29 further comprising a switch electrically connected to the motor to transition the polisher between an activated state for working on a workpiece and a deactivated state, the switch being operable while a two-handed grip is maintained on the handle of the polisher.

35. A polisher according to claim 34 wherein the switch forms a circular ring shaped body defining an aperture through which at least a portion of the motor is disposed, the switch further including first and second operators extending from the body and through the housing with the first operator being located near the first end of the handle and the second operator being located near the second end of the handle so that the switch may be operated from either handle end.

* * * * *